(12) United States Patent
Dahl

(10) Patent No.: US 9,329,728 B2
(45) Date of Patent: *May 3, 2016

(54) USER INTERFACES

(75) Inventor: Tobias Dahl, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 764 days.

This patent is subject to a terminal disclaimer.

(21) Appl. No.: 13/500,898

(22) PCT Filed: Oct. 7, 2010

(86) PCT No.: PCT/GB2010/051684
§ 371 (c)(1),
(2), (4) Date: Jun. 22, 2012

(87) PCT Pub. No.: WO2011/042749
PCT Pub. Date: Apr. 14, 2011

(65) Prior Publication Data
US 2012/0313900 A1   Dec. 13, 2012

(30) Foreign Application Priority Data

Oct. 7, 2009 (GB) .................................. 0917526.6
Mar. 17, 2010 (GB) .................................. 1004434.5
May 28, 2010 (GB) .................................. 1009011.6

(51) Int. Cl.
*G06F 3/043* (2006.01)
*G01S 13/46* (2006.01)

(52) U.S. Cl.
CPC ............ *G06F 3/043* (2013.01); *G01S 2013/466* (2013.01); *G01S 2013/468* (2013.01); *G06F 2203/04101* (2013.01)

(58) Field of Classification Search
None
See application file for complete search history.

(56) References Cited

U.S. PATENT DOCUMENTS

| 5,059,959 A | 10/1991 | Barry |
| 6,346,047 B1 * | 2/2002 | Sobota et al. .................... 463/39 |
| 7,002,876 B2 | 2/2006 | Komai |
| 7,525,050 B1 * | 4/2009 | Weaver et al. ............. 178/18.04 |
| 2003/0195723 A1 * | 10/2003 | Bensky ................... G01S 13/84 702/189 |

(Continued)

FOREIGN PATENT DOCUMENTS

| JP | 2007/065880 A | 3/2007 |
| WO | WO 99/35745 A1 | 7/1999 |

(Continued)

OTHER PUBLICATIONS

International Search Report for International application No. PCT/GB2010/051684 dated Feb. 18, 2011 by European Patent Office.

(Continued)

*Primary Examiner* — Gerald Johnson
*Assistant Examiner* — Maheen Javed
(74) *Attorney, Agent, or Firm* — Beyer Law Group LLP

(57) ABSTRACT

A first electronic device is operated in the presence of a second electronic device. Both are configured to transmit acoustic signals, the first being configured to transmit signals with a first characteristic. The first device determines the presence of the second device and thereafter transmits acoustic signals having a second, signal characteristic, different from the first characteristic, and giving a reduced interference between signals transmitted from the first and second devices respectively than the first signal characteristic. Acoustic signals comprising reflections of the transmitted signals from an object are received at the first device, and are used to characterise the motion of the object and thereby control a function of the first device.

55 Claims, 11 Drawing Sheets

(56) References Cited

U.S. PATENT DOCUMENTS

| | | | |
|---|---|---|---|
| 2006/0161871 A1 | 7/2006 | Hotelling et al. | |
| 2007/0121097 A1* | 5/2007 | Boillot | 356/28 |
| 2007/0288194 A1 | 12/2007 | Boillot | |
| 2009/0199641 A1* | 8/2009 | Bhardwaj | G01H 5/00 73/597 |
| 2009/0265470 A1* | 10/2009 | Shen | G06F 1/1694 709/227 |
| 2010/0090970 A1* | 4/2010 | Lin | G06F 1/1609 345/173 |

FOREIGN PATENT DOCUMENTS

| WO | WO 2006/067436 | 6/2006 |
|---|---|---|
| WO | WO 2009/115799 | 9/2009 |

OTHER PUBLICATIONS

International Search Report for International application No. PCT/GB2009/000901 dated Aug. 14, 2009 by European Patent Office.

Holmberg P. et al., "Robust ultrasonic range finder—an FFT analysis", Measurement Science and Technology, IOP, Bristol, GB, vol. 3, No. 11, Nov. 1, 1992, pp. 1025-1037.

Webb P. et al., "Suppression of second-time around echoes in high firing rate ultrasonic transducers", NDT&E International UK, vol. 28, No. 2, Apr. 1995, pp. 89-93.

Klahold J. et al., "Continuous sonar sensing for mobile mini-robots" Proceedings 2002 IEEE International Conference on Robotics and Automation (Cat. No. 02CH37292), IEEE Piscataway, NJ, USA, vol. 1, 2002, pp. 323-328.

\* cited by examiner

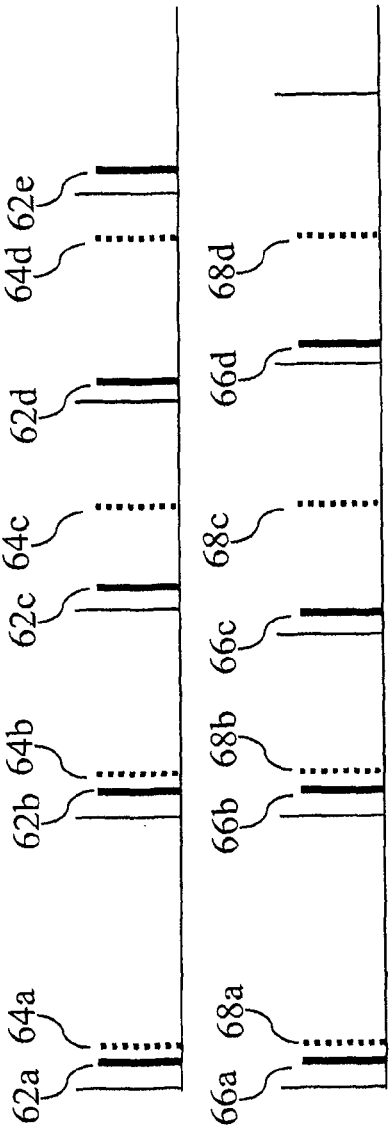

USER INTERFACES

RELATED APPLICATIONS

This application is the National Stage of International Application No. PCT/GB2010/051684, filed Oct. 7, 2010, which claims the benefit of GB 1009011.6, filed May 28, 2010. Each of these applications is hereby expressly incorporated by reference in its entirety herein.

This invention relates to user interfaces for electronic devices. It relates particularly to interfaces which involve characterising the motion of one or more objects using acoustic signals; especially, but not exclusively, ultrasound signals.

It is known to track an object for touchless interaction with a computing device with an ultrasonic transmitter and a number of receivers using time-of-flight measurements. Indeed various proposals for such tracking have been made—e.g. in US patent application US 2006/0161871 by Apple, which relates particularly to input to a handheld device by a user's finger. However these proposals have shortcomings. In particular, they can be sensitive to interference from echoes caused by other objects and from active sources of noise.

Optical tracking based on time-of-flight principles has also been attempted; however, the technology is complex and costly, due in part to the need for optical components and the very high clock-speeds required. Furthermore, it is impossible to flush-mount a camera having a wide (e.g. 180-degree) field of view, meaning that camera lenses must partly project from the surface of the device so that they are exposed to damage and contamination, as well as being potentially less aesthetically-pleasing.

Interference is particularly problematic in acoustic tracking systems, compared with optical ones, due to the wider dispersion characteristics and much lower speed of sound waves.

The inventor has recognised a particular problem when two or more devices, especially mobile devices, attempt to use acoustic input systems within audible range of each other. They are likely to interfere with each other, especially when they are configured to transmit similar or identical acoustic signals to each other (e.g. in the same frequency range). In such situations, using prior art approaches, one device will typically be unable to distinguish between reflections from an object of interest and sound resulting from the other device. This can lead to a failure to recognise a user input correctly. In particular, the direct path sound from the other device may be many times stronger than the reflection from the input object, and can therefore swamp the echoes if they overlap in time of receipt. Since users typically have a low tolerance to input failures, this can be a very serious problem. As the number of devices employing acoustic input mechanisms increases, the incidences of multiple devices being within audible range of each other is set to increases.

The present invention aims to overcome these shortcomings in known approaches.

From a first aspect the invention provides a method of operating a first electronic device in the presence of a second electronic device wherein said first and second devices are configured to transmit acoustic signals, said first device being configured to transmit signals with a first signal characteristic, said method comprising:

the first device determining the presence of the second device;
thereafter transmitting acoustic signals from the first device, said signals having a second signal characteristic, different from the first signal characteristic;
receiving acoustic signals at the first device comprising reflections of the transmitted signals from an object; and
using said received signals to characterise the motion of the object and thereby control a function of the first device;
wherein said second signal characteristic gives a reduced interference between signals transmitted from the first and second devices respectively than the first signal characteristic.

The invention extends to a first electronic device comprising:

a transmitter adapted to transmit acoustic signals;
means for configuring the transmitter to transmit signals with a first signal characteristic;
means for determining the presence of a second electronic device, the second device being configured to transmit acoustic signals;
means for configuring the transmitter, after determining the presence of the second device, to transmit signals with a second signal characteristic, different from the first signal characteristic;
a receiver adapted to receive acoustic signals comprising reflections of the transmitted signals of the first device from an object; and
means for using said received signals to characterise the motion of the object and thereby control a function of the first device,
wherein said second signal characteristic gives a reduced interference between signals transmitted from the first and second devices respectively than the first signal characteristic.

The invention also extends to a computer software product, and to a carrier bearing the same, configured, when run on a first electronic device, to operate the device in the presence of a second electronic device, wherein said first and second devices are configured to transmit acoustic signals, comprising:

instructions for transmitting acoustic signals with a first signal characteristic;
logic for determining the presence of the second device;
instructions for transmitting, after said presence is determined, acoustic signals with a second signal characteristic, different from the first signal characteristic;
logic for processing acoustic signals received at the first device comprising reflections of the transmitted signals from an object; and
logic adapted to use said received signals to characterise the motion of the object and thereby control a function of the first device,
wherein said second signal characteristic gives a reduced interference between signals transmitted from the first and second devices respectively than the first signal characteristic.

Thus it will be seen by the skilled person that the first device or apparatus is able to detect the presence of a second device and alter its transmission to reduce interference from the second device, leading to an improved ability to characterise the motion of the object and thus greater reliability of operation. It is envisaged that it will be the reflections of the transmitted signals from the object that are used to characterise the motion of the object and thereby control a function of the first device.

There are several ways in which the first device can alter its transmission to reduce or avoid interference from the second device. In one set of embodiments the transmit signals are periodic or quasi-periodic so as to define a frame rate, the recited signal characteristics comprising different respective frame rates. Thus if the presence of another device is determined the first device alters the frame rate of its transmissions. This has a corresponding effect on the timing of received signals which can reduce or avoid the aforementioned interference as will be explained in greater detail hereinbelow. Preferably the frame rate is altered so as to be significantly different from the frame rate of the second device—e.g. more than 10% different or more than 20% different. This would avoid the potential problem of a slow rise and fall of overlap in frame rates which might not be easy to deal with.

In another set of embodiments, the difference between the first and second signal characteristics could be a fixed time offset between them. This could be done by adjusting the frame length of a fixed number of frames. For example, the length of just a single frame may be altered relative to the immediately preceding and immediately following frames; this introduces a corresponding offset in the timing of the subsequent frames. Alternatively a plurality of frames, not necessarily consecutive, could be altered.

Whatever the number of adjusted frames, the frame length may be shortened or lengthened compared with the unadjusted frames. Where it is lengthened, this is preferably accomplished by introducing a period in which no transmission occurs. Again this affects the received signals which can reduce or avoid the aforementioned interference as will be explained in greater detail hereinbelow. It can be particularly advantageous when the second device is another apparatus transmitting acoustic signals with a frame rate substantially equal to that of the signals from the first device. In this situation, the introduction of an offset can have the effect of a relative time-shift between reflections from the object and interfering signals (both direct and indirect) arising from the second device. This can advantageously temporally displace the sound from the second device away from the reflections of interest, as received by the first device, thereby reducing or removing any interference between them.

The two sets of embodiments described above are not mutually exclusive. Thus both a change in frame rate and an offset could be introduced.

When viewed from another aspect the invention provides a method of operating an electronic device in the presence of interference comprising:
  transmitting a first acoustic signal according to a timing pattern;
  receiving a second acoustic signal;
  determining whether said second acoustic signal includes a component matching a predetermined interference criterion, wherein said interference criterion includes a requirement that the component does not arise from a reflection of the first signal; and
  if said interference criterion is met, changing said timing pattern.

This aspect extends to an electronic device comprising:
a transmitter adapted to transmit acoustic signals;
means for configuring the transmitter to transmit a first acoustic signal according to a timing pattern;
a receiver adapted to receive a second acoustic signal; and
means for determining whether said second acoustic signal includes a component matching a predetermined interference criterion, wherein said interference criterion includes a requirement that the component does not arise from a reflection of the first signal, and, if said interference criterion is met, changing said timing pattern.

Thus it will be seen by those skilled in the art that in accordance with this aspect of the invention a device can determine whether it is suffering from a certain type of interference, not arising from reflections of the signals it has transmitted, which could be transmissions from a second device. If the interference is indeed related to transmissions from another device, by changing the timing pattern of its own transmissions appropriately, the device can receive desired reflections of its own signals—e.g. those reflected from a nearby input object—separated in time from the interfering transmissions. Thus in a set of preferred embodiments the device is adapted to receive reflections of said first acoustic signal from an input object and to use those reflections to determine an input to the device based on the position, and/or motion of the input object.

The Applicant has further appreciated that analogous to the situation in which a device suffers interference from an external source, is the situation in which it is located close to a strong reflector e.g. a wall or other hard surface such that said second acoustic signal includes a reflection of the first acoustic signal. This reflection is likely to be much stronger than that from say the user's hand or finger—i.e. more akin to the direct path signal from another device in terms of its impact on the desired signal. A large reflector such as a wall or a ceiling, can be interpreted as a secondary source emitting from a 'virtual position' behind the wall, i.e. it can be understood as a strong source in itself, in contrast with other, more scattered and weaker echoes. However the same solution may be applied. Accordingly when viewed from another aspect the invention provides a method of operating an electronic device to receive an input to the device based on the position, and/or motion of an input object. the method comprising:
  transmitting a first acoustic signal according to a timing pattern towards said input object;
  receiving a second acoustic signal including a reflection of said first acoustic signal from said input object;
  determining whether said second acoustic signal includes a component matching a predetermined interference criterion, wherein said interference criterion includes a requirement that the component does not arise from a reflection of the first signal from the input object;
  if said interference criterion is met, changing said timing pattern.

This aspect extends to an electronic device for receiving an input based on the position and/or motion of an input object and comprising:
  a transmitter adapted to transmit acoustic signals;
  means for configuring the transmitter to transmit a first acoustic signal according to a timing pattern towards said input object;
  a receiver adapted to receive a second acoustic signal including a reflection of said first acoustic signal from said input object; and
  means for determining whether said second acoustic signal includes a component matching a predetermined interference criterion, wherein said interference criterion includes a requirement that the component does not arise from a reflection of the first signal from the input object, and, if said interference criterion is met, changing said timing pattern.

Typically the input object will be relatively close to the first device so that the period of time during which the first device needs to monitor for reflections from the input object after making a transmission is correspondingly relatively short. Thus in a preferred set of embodiments the device uses only reflections received during a sample window to determine said input Assuming a typical frame rate this allows relatively long periods of time during each time slot (the time between frames) for the second acoustic signal to be received without interfering. For example if a frame rate of 120 Hz is used and the input object is 30 cm away, the time of flight for an ultrasonic signal transmitted from the device and reflected again is approximately 1.82 milliseconds (assuming a speed of sound of 330 m/s) whereas the gap between transmissions is 8.33 milliseconds. Thus for an input range of approximately 30 cm of the order of only a fifth of the time frame needs be monitored, meaning that changing the timing so that the signal from the second device occurs in the other four-fifths of the time slot will ensure that it does not, in fact, interfere with the desired reflections.

The interference criterion could take one of several different forms. In some embodiments the criterion includes applying a signal level threshold. In one set of embodiments it includes a determination as to whether the signal component is structured, as opposed to being random. This could be achieved by applying one or more convolution filters to the second acoustic signal.

In a set of preferred embodiments where two or more devices are present they transmit acoustic signals having the same encoding or encoding which is sufficiently similar that the devolution code applied to the signals received by the first device focuses the direct path signal from the second device into a small enough time period that it can be time-shifted away from the reflections of interest (from the input object). More generally in a preferred set of embodiments an arrangement of first and second devices is adapted so that the cross-correlation between the acoustic signal transmitted from the second device and the convolution applied by the first device, in combination with the change in the timing pattern, results in a noise level in the sample window arising from the cross-correlation being below a threshold.

It will be appreciated that conveniently each device is arranged to operate to the same protocol such that it may perform the role of the 'first' or 'second' device in the set of embodiments set out above.

In some embodiments the device or the first device is arranged to determine for itself what the change in the timing pattern will be. Such a change could be predetermined or random. Conveniently it is chosen according to a standard protocol. In other embodiments the first device could determine what the change in the timing pattern should be, based on information it receives from the second device—e.g. over a separate radio, infra-red or other communication channel, or for example by identifying the structure on, or of, the second signal component. This could be useful for example where different ultrasound protocols existed as it would enable the first device to take different action depending on whether the second device is operating according to the same protocol, a different but known protocol, or an unknown protocol.

The change in timing in accordance with the foregoing aspect of the invention preferably comprises commencing said acoustic signal transmission at a different point in the time-frame. In one set of embodiments the change in timing pattern comprises altering the length of the transmission. This could be beneficial in dealing both with true random noise and with structured noise—e.g. from another device since by lengthening the transmission time, the signal to noise ratio of the received reflected signals can be improved. Similarly in low noise periods, the transmission length can be reduced to conserve battery power.

When another device is present in the vicinity of the device the signal the other device transmits is likely to be strong relative to background noise. In this situation therefore—i.e. where the device determines that at least a component of the second acoustic signal arises from another electronic device, it is advantageous in some embodiments for the device to increase the power of its transmissions. This is novel and inventive in its own right and thus when viewed from a further aspect the invention provides a first portable electronic device comprising an ultrasonic transmitter and an ultrasonic receiver and adapted to detect the presence of a second device transmitting ultrasonic signals, said first device being adapted to transmit ultrasonic signals at a power level which is dependent on whether said second device is detected.

Considering another set of embodiments, it is noted that many real-world environments contain ultrasonic or other noise sources. These are often of short duration, i.e. they may relate to a pulsed signal, or an impulse signal such as the collision of one object into another. A typical example is a key on a key-ring, or another metallic object, hitting a surface, such as another key. Another example is that of active noise sources such as ranging devices or unwanted-animal repellents. A device embodying the invention can detect that a certain part of a received frame is contaminated with noise. This corresponds to the specific time-frequency resource, i.e. the ultrasonic band, being occupied by something other than signals arising from the device's own transmissions.

A system can respond to such an event by employing additional resources. For example, it may transmit more frequently, or use longer codes or chirps. This effectively ensures that if some of the data 'packets', i.e. portions of the received signals, are contaminated by noise, there are other packets that can still be used for channel estimation and feature tracking. When the interfering noise ceases, the system can return to a state where it demands fewer resources for interference-battling purposes. The amount of resource a system demands in the presence of interference could be a function of the strength, frequency, time-span or other characteristic of the interfering source.

A system according to the invention may also respond by increasing its transmission strength, to try to dominate or swamp the noise or interference signal. When these sources cease to be present, the transmission strength can be lowered again to save battery and free up resources for other system users. Resources are effectively freed up when the output power is lowered, since the power of the far-away echoic signals effectively limits the time-frequency resources available to other devices.

Preferably therefore, a device is configured to detect the presence of a noise or interfering source, and to start using an increased portion of the time-frequency resource, e.g. on detecting noise or interference, it starts transmitting signals of greater duration or bandwidth or intensity than those it transmitted immediately beforehand. It preferably detects when the noise source has gone, and reduces its resource consumption. It might, for example, transmit additional information, or the same information at higher power, in response to detecting a higher interference level, and then reduce these in response to a lower interference level.

These two different ways of effectively assigning more frequency resources, either by increasing power, or by increasing the signal length, have somewhat different implications.

In many situations, it is preferable to increase the signal length or frequency, rather than the power. This is because keeping the output signal amplitude the same in all conditions avoids the need to adjust the transmit and receive amplifiers. Such adjustment would otherwise be necessary, particularly at the receiver, to compensate for very high or very low input levels, so as to avoid either losing data bits due to poor dynamic range, or encountering overflow or clipping problems.

There are many ways in which the presence of the second device may be determined.

In a first main set of embodiments the first device determines the presence of the second device by the acoustic signals the second device transmits. This could for example be done by detecting the signals directly and determining an inherent feature or characteristic that is sufficiently distinctive to make the deduction. Thus in one set of such embodiments the first device is configured to recognise one or more of a frequency, pattern of frequencies, spread of frequencies, change of frequencies, timing, repetition rate etc. to determine said presence. Such embodiments clearly encompass the transmit signals of the second device being specifically encoded for recognition by another device. This could, for example, follow an agreed international standard. In these embodiments the first device might determine the presence of the second device before it starts transmitting—i.e. it might change to signals with the second characteristic before transmitting those with the first. This has the potential to avoid interference for either or both device.

In another subset of the first main set of embodiments the second device's signals are detected indirectly as an interference effect on the signals received by the first device arising from transmissions by the first device itself. This is described in more detail below.

To appreciate certain features of the invention more clearly, it can be helpful to visualise the samples of a signal received in a time-slot as being entered into successive cells running down one column of a matrix (optionally after additional processing such as calculation of an impulse response). Successive columns of the matrix then correspond to successive time frames. Each time frame preferably abuts the succeeding time frame. The values in the matrix may correspond to energy, amplitude, the envelope of amplitude, or any other appropriate quantification of the received signals. The matrix can be thought of as an image, with the values of the matrix corresponding to pixels of varying brightness levels in the image. Where these values represent impulse response taps the matrix can be considered as an impulse response image. Typically, the image is representative of a certain time-of-flight (TOF)-range, referred to above as the "sample window" i.e. it does not 'focus' into the whole reflective space, but rather into a space close to the device or at a particular range from the device.

The above visualisation can be helpful for understanding some embodiments of the invention, but may also more directly correspond to the actual implementation of some embodiments. For example, one or more arrays or matrices, or equivalent structures, related to an impulse response image may be constructed in a memory of an apparatus, and analysed to characterise the motion of the object.

Where the interference is detected, this may be accomplished by any suitable means. In some embodiments it is detected as noise received simultaneously or overlapping with echoes from the object of interest.

In some embodiments, detecting interference comprises detecting a pattern in the signals received by the first device that corresponds to transmissions occurring at a frame rate that differs from the frame rate being employed by the first device. The pattern may comprises signals travelling directly from the second device to the first and/or reflected via one or more objects. The direct path signals will, of course, arrive first and are also likely to be stronger than any reflections of the second device's emissions. For example, the first device may detect a similar signal occurring progressively earlier or later in each impulse response it calculates. In an impulse response image, this could correspond to a narrow or diffuse diagonal line. Such a pattern might be distinguished from genuine reflections of signals transmitted by the first device in that it may comprise one relatively strong line, corresponding to the direct path signal (which may in some situations be stronger than any of the reflections of the first device's own signals), and a wider pattern of echoes, distributed across the impulse response image, but which nonetheless exhibit a similar diagonal trend; this is different from the typical reflection of the first device's signals which, while they may exhibit a diagonal trend for a while, will typically not do so for a protracted period, and will typically be confined to a relatively narrow time window within each impulse response.

In order to provoke the appearance of such a distinctive pattern, the first device may change its frame rate at intervals or continuously, typically only by a relatively small variation (e.g. 1 to 10%), so that, while it may happen to have exactly the same rate as the second device for a time, this will not remain the case. These changes preferably occur on a random or pseudo-random basis, to ensure that two devices implementing the same scheme do not change their rates in coordinated fashion.

The first device may additionally or instead change its frame rate and compare signals received before the change with those received afterwards. The step of detecting interference may thus comprise adjusting the first frame rate and determining a pattern within the received signals that is not affected by the adjustment.

Where the first device detects interference at a different frame rate, it may process received signals in order to estimate the different frame rate.

In a second main set of embodiments for determining the presence of the second device, a separate communication channel is established. Communication may, for example, occur over another acoustic channel, or over an electromagnetic channel such as a radio-frequency or infrared channel. This gives many possibilities.

Preferably the first device receives information over the communication channel from the second device and adjusts its transmissions as described above. The information could be simple presence or identification information but equally could comprise information as to how to adjust its transmissions. This allows the devices to collaborate to allow one or both to adjust their transmissions so as best to avoid interference. This could follow any predetermined algorithm, e.g. one set out in international standard, or could be ad hoc.

The communication channel may be one-way from the first device to the second device, but is preferably two way, which allows the devices to cooperate fully in determining what adjustments to make. Although the invention has so far been described with reference to reducing interference at the first device, it will be understood that it is likely to be desirable to reduce interference at the second device caused by the first device's transmissions. To this end, the devices may communicate to coordinate adjustments to their transmissions so as to reduce or minimise or substantially eradicate interference in the motion characterisation operations of both devices.

When viewed from a further aspect the invention comprises a method of controlling a device to characterise the location or motion of an input object, comprising:
 passing a signal between the device and a second device and
 determining information relating to the location of the second device relative to the first device from the received signal;
 transmitting an acoustic signal from the first device; and
 receiving at the first device a receive signal comprising a reflection of the acoustic signal off the input object;

wherein at least one characteristic of the transmission of the acoustic signal is determined using the information relating to the location of the second device.

In one set of embodiments the characteristic which is altered depending upon the location of the second device is the direction of propagation of the signal. This could for example be achieved by physically steering a directional transmitter. More conveniently however it is achieved by transmitting the acoustic signal using two or more transmitters and applying beam-forming to determine the direction of propagation. In both cases the direction of propagation could be defined as the direction in which the maximum energy propagates. It will be appreciated that by one or both devices steering their transmit beam away from the other, the problem of direct-path interference is substantially reduced.

In a set of embodiments (which may overlap the embodiments set out above) one or each device comprises a plurality of transmitters and the transmission characteristic altered comprises which transmitter or subset of transmitters is used for transmission. As with the steerable beam, selecting which transmission channel to use based on the location of the second device makes it easier to select a channel which uses a transmitter that transmits away or more away from the second device.

In another set of embodiments the transmission characteristic is the timing of the transmission. As described above in relation to previous aspects of the invention this allows the signals from the respective devices to be transmitted with sufficient separation in time that neither interferes with desired reflections being received by the other. This could take any form e.g. a simple trial-and-error delay introduction to a full time-division multiplexing protocol—although in accordance with this aspect of the invention there is a dependence on the relative location of another device. Another possibility—also previously described—would be for the characteristic to be the frame rate or repetition rate of the signal.

The concept of spontaneous communication between nearby devices in order to reduce or prevent interference between them in signals used for a user interface is novel and inventive in its own right and thus when viewed from another aspect, the invention provides a method of operating two or more portable electronic devices said devices each transmitting respective signals, receiving reflections of the respective transmitted signals and each device controlling a function thereof in dependence on said received reflection, the method further comprising:

transferring information between the devices; and
one or both of said devices altering the signals it transmits based on said information.

The invention extends to a first portable electronic device comprising:

a transmitter for transmitting signals;
a receiver for receiving a reflection of the transmitted signals;
means configured to control a function of the device in dependence on the received reflection;
means for transmitting or receiving information from a second portable electronic device; and
means for altering the signals transmitted by the first or second device based on said information.

The invention also extends to computer software, and to a carrier bearing the same, configured, when run on a portable electronic device, to operate the device in the presence of a second portable electronic device, said devices each transmitting respective signals, receiving reflections of the respective transmitted signals and each device controlling a function thereof in dependence on said received reflection, the software comprising:

instructions for transferring information between the devices; and
instructions for altering the signals transmitted by the first or second device based on said information.

Thus two portable devices, such as mobile telephones, that were not previously communicating with each other can automatically communicate with one another so as to reduce possible interference between signals that each transmits in operation of a user interface. The transmitted signals may be acoustic e.g. ultrasound, or electromagnetic, such as radio-frequency or optical. The communication may be over the same medium as the said transmitted signals or over a different medium.

The information may be transferred by means of a portable storage device, such as a USB memory device. The transfer may be unidirectional but is preferably bi-directional. In some embodiments, the said transmitted signals are ultrasound and the communication occurs over an RF channel. In other embodiments, the information transfer happens over the same acoustic channel on which the signals are transmitted, e.g. in the same frequency band and/or using the same protocol and/or using the same coding. Features described herein with reference to other aspects may be applied to this aspect also.

This aspect may be particularly useful in a scenario in which two generations of an ultrasound-emitting product are within audible range of each other. This might occur, for example when a user of one device enters the same room as a user of an older device. This gives rise to a risk that the two devices might try to make use of the ultrasonic channel in an uncoordinated fashion. In particular, a first generation of ultrasonic touchless devices may be ignorant as to what a later generation, e.g. launched a few years later, may expect from the quality of the ultrasonic channel and co-operation between devices.

However, embodiments of the aspect of the invention set out above allow this problem to be addressed by transferring information from one device to the other. The information transferred may constitute an updated driver, or a patch for an existing driver, for example.

Where such updating is not possible, there is also the option of letting the older device continue behaving as before, and requiring the newer device to adjust its transmissions to allow for this. Thus a second device, according to various aspects of the invention, on detecting a first device using a particular frequency bandwidth or coding scheme or protocol, may adapt its frequency bandwidth or coding scheme or protocol so as to reduce interference. The older device may also have a minimum intelligence, in which case it reduces its use of the resource to say, half the frame rate or half the bandwidth, either when detecting a second device or when the second device sends a message. This has the effect of reducing the user experience quality of the older device in favour of the newer device As explained elsewhere, it can be desirable for all devices to use the same code combined with time-gating, since using different codes can lead to "smeared" cross-correlations. However, the transmit code schemes of an older and a newer device could, by default, vary substantially, e.g. by operating at different sampling rates, different code lengths, different time-shifts around the base etc. A newer device might therefore: detect that a previous or older or other-generation device is present; listen to the signals the earlier device is transmitting; and identify a characteristic of these signals, perhaps using prior knowledge of earlier signal types; and start using these codes itself as part of its transmission scheme. The newer device might optionally communicate with the earlier device to instruct it to change a characteristic of its transmissions.

One device may detect the presence of the other. Such detection could involve the device accessing an internal or external database. The device (typically the newer device) may record a received signal and submit or match information relating to the signal with a database. It may determine from the database, or receive from a third party, information relating to a characteristic of the other device and/or instructions as to what kind of device or noise source has contributed to the recorded signal. It may receive instruction as to how to respond. Options for how to respond include: carrying on using some set of robust codes (its own codes or the older device's codes or some other codes), and/or informing the user of the (e.g. newer) device to update drivers of the other (e.g. older) device, and/or informing the user of the other (e.g. older) device to update the drivers. The newer device could also update its drivers from time to time, from a database.

In some embodiments of this aspect, or other aspects, of the invention, a first device may cease transmitting signals while it receives signals from another device, which it processes to determine information from or about the second device. By stopping its own transmissions, the first device can avoid having to attempt to separate received signals originating from its own transmissions from signals from the second device. The processing can therefore be more efficient and/or more accurate.

If two devices share a radio link, the entire driver upload process could be carried out without the users or owners of the devices being aware of it, perhaps other than providing some sort of confirmation that new driver upload could take place. There could be an additional verification step if one or both devices are connected to the Internet, involving a check-sum or other security measure to ensure the authenticity of the driver that is to be uploaded.

Where one device transfers information to the other acoustically, e.g. ultrasonically, this can be advantageous since no other communication apparatus need be provided. Since the ultrasonic channel typically has quite low bandwidth, transfer of entire protocols or drivers might take considerable time. The process can be sped up however, if the driver can be compressed, i.e. if the instructions for altering the transmitted signals can be described by very few parameters, rather than a full set of compiled or non-compiled instructions.

For instance, the operation of a transmit system could be described by the following parameters: (1) the coded signal including its length, (2) the ping rate, (3) the shift-around-the-base sequence, and (4) the sampling rate.

When transferring the information ultrasonically, there could be provided a dedicated time for the transfer, or it could happen in parallel with receiving and processing reflections.

Uploading drivers as a separate step when the two devices are not being used for touchless operation could happen when there is little or no motion close to the devices and/or when the quality of the ultrasonic link that is established is of sufficient quality. In practice, one could adopt an hopeful strategy whereby, if a device observes that nothing is happening nearby, it uses this spare time to transmit an ultrasonic code, hoping that a second device will recognize it and take steps to jointly coordinate actions or resolve spectrum conflicts.

Such cooperation can mean either a forced upload of driver, or just an agreement to communicate later, for instance, to try to return to the conversation at a given later time, or in a set of given intervals.

Alternatively, information could be transferred during touchless transmission. To avoid degrading the quality of a touchless interaction experience for a user of one of the devices, information is preferably transferred with minimal impact on the update rate or positioning accuracy of the system. In such embodiments, one of the devices transfers information encoded on the said transmitted signals, the reflections of which are used in controlling a function of the device. In some embodiments, the transmitted signal comprises the transferred information, without any encoding; this might be the case where the information simply comprises a characteristic of the transmitted signal(s), such as its frequency or bandwidth, etc. which is derivable from the signal itself.

A device may, when moving from one transmit signal to another, change the signs of the code depending on a binary message to be communicated. For example, if at time t the first device transmits the signal s(.), it could at t+1 transmit the same code with an opposite sign, i.e. −s(.). To the device itself this makes no difference for the touchless operation: knowing that a signal was sent with a negative sign can easily be corrected for by negating the incoming signal. For the second device, however, this sign change can be tracked, even when devices are moving. It is much simpler if the second device knows the shift-around-the-base pattern of the first device, as can be known through observation, through sharing this information or through protocols. However, even without this, knowing that a direct path signal between devices can be a strong source of interference, sign changes can be observed by correlating successive timeframes, and looking for a maximum or a minimum peak in the cross-correlation function.

An alternative to changing the sign of the signal could be to change the signal in some other way e.g. the direction of a chirp (up or down), or the phase of a narrowband code, or the multiple phases of a broadband code.

Alternatively the shift-around-the-base functions can carry information. Again, if the direct path signal imprint is strong, they can be detected, as can their "vertical positions" in an impulse response image. The varying vertical positions can be used as a base for coding information.

Alternatively again, different codes can be used by the different devices. These codes can come from an set of "legal codes". Each device can use a subset of these codes for transmission and touchless tracking, under the hope that the "smearing" in the cross-correlations is not going to be too bad. The other device observes which of the codes from the legal (sub)set is being used, and infers motion from the selection pattern.

The information transferred need not necessarily relate to avoiding interference between the two devices, such as between an older and a newer device, but might relate to avoiding interference from a noise source other than a portable electronic device configured to process reflections of signals.

Although the invention has so far been discussed with reference to two devices, it will be appreciated that it may readily be extended to a larger number of devices. The first device may communicate with none, some or all of these other devices. Where a plurality of communicating devices are present, one of these may assume a master role, directing adjustments in emissions by the other device(s), or the devices may communicate as equal peers, and arrive at a set of mutually-beneficial adjustments. In some embodiments, the adjustments will be determined by computation alone; in other embodiments a process of trial-and-improvement may take place, in which adjustments to the emissions are implemented, the effects analysed, and refinements made.

Especially where the devices do not communicate to establish compatible frame rates (but possibly even when they do), the first device may iteratively adjust the first frame rate, and attempt to characterise the motion of the object, over a number of iterations, in order to determine an adjustment that improves the accuracy of the motion characterisation.

More generally, methods of the invention may further comprise iteratively adjusting the transmissions of the first and/or second device, and attempting to characterise the motion of the object, over a number of iterations, in order to determine an adjustment that improves the accuracy of the motion characterisation.

In a further set of embodiments, a different time-shift function is applied to the respective transmitted signals of two or more devices. By applying a suitable inverse shift function, one device can "focus in" on its own echoes, while effectively "scattering the echoes" from another device.

This idea is inventive in its own right, and thus, from a further aspect, the invention provides a method of operating a first electronic device in the presence of a second electronic device, both devices transmitting acoustic signals, wherein the first device:
  applies a time-shift function to an initial signal to produce a transmit signal;
  transmits the transmit signal;
  receives a plurality of received signals including a first received signal arising from reflection of said transmit signal from an object of interest and a second received signal arising from acoustic transmissions from the second device;
  uses the time-shift function to distinguish between said first and second received signals; and
  uses the first received signal to characterise the motion of the object and thereby control a function of the first device.

The invention extends to an electronic device comprising:
  means for applying a time-shift function to an initial signal to produce a transmit signal;
  a transmitter adapted to transmit said transmit signal;
  a receiver adapted to receive a plurality of received signals including a first received signal arising from reflection of said transmit signal from an object of interest and a second received signal arising from acoustic transmissions from a second device;
  means for using the time-shift function to distinguish between said first and second received signals; and
  means for using the first received signal to characterise the motion of the object and thereby control a function of the first device.

It further extends to software, and to a carrier bearing software, configured, when executed on a first electronic device, to operate the first device in the presence of a second electronic device, both devices transmitting acoustic signals, comprising:
  logic arranged to apply a time-shift function to an initial signal to produce a transmit signal;
  instructions for transmitting the transmit signals;
  logic for processing a plurality of signals received by the first device, including a first received signal arising from reflection of said transmit signal from an object of interest and a second received signal arising from acoustic transmissions from a second device;
  logic arranged to use the time-shift function to distinguish between said first and second received signals; and
  logic arranged to use the first received signal to characterise the motion of the object and thereby control a function of the first device.

The time-shift function preferably causes varying offsets between components of the transmit signal; for example, chirps with a varying pattern of intervals between them. This is preferably accomplished by adding dithering to an underlying stable frame rate. The second device may also apply a time-shift function to an initial signal to produce a transmit signal and use the time-shift function to distinguish signals from the first device and reflections from an object of interest. In this case, the time-shift functions are preferably different. There are many ways in which this could be achieved. Each device could be allocated a unique code or at least one of a series of codes, which code determines the time-shift function applied to its signals. Alternatively the time-shift function for a given device at a given time could comprise random or pseudo-random shifts in the signals, e.g. seeded differently between the two devices. Such schemes can give an acceptably low probability of two devices interfering with one another in practice.

In another set of embodiments the devices may communicate, either uni- or bi-directionally, with one another so as to ensure that they use different time-shift functions from each other, or they could otherwise alter their behaviour upon determining the presence of another device.

The first electronic device may also calculate an impulse response from the received signal or signals as if the received signal had been produced by the initial signal; and may use the impulse response to distinguish between the first and second received signals. It may also, in some embodiments, use the impulse response to distinguish between received signals arising from reflections from objects at different ranges.

So, rather than 'conventional' impulse response estimation, the impulse responses are altered by the application of the time-shift function to the transmitted signals. The effect of the time-shift function to these impulse responses will be different for reflections from different ranges because of the differing times of flight. So even for reflections arriving at the receiver at similar times, the impulse responses can be distinguished since those arriving from further away will have had a different part of the time shift function applied from those arriving from closer. Similarly, the signals from the second device can be distinguished from those of reflections arising from signals from the first device.

Calculating an impulse response from the received signal as if the received signal had been produced by the initial signal is quite different from merely averaging the raw signal over time and enables accurate discrimination between the reflections from objects at different ranges and between the signals from the different devices. A problem with averaging is that the unwanted echoes and signals end up being smeared and therefore less well defined and identifiable. Another disadvantage with simplistic averaging of the raw signal resulting from short pulses is that it risks cancelling out a wanted part of the signal where consecutive pulses are shifted relative to one another such that they are mutually out-of-phase with each other. The Applicant has found that using longer signals and calculating impulse responses can provide a better signal-to-noise ratio and better echo discrimination.

Preferably the received signal is used to calculate a distance to an object of interest.

Processing could be carried out in the impulse response domain either exclusively or as well as processing in the raw signal domain. Indeed any processing described in the impulse response domain in the present specification may, where appropriate, be replaced by equivalent processing in the raw signal domain, or in any linear transformation of the raw signal domain or the impulse response domain (e.g. fractional Fourier domain, wavelet domain). Where appropriate, non-linear transformations, such as envelope or logarithmic envelope transformations can be used to better distinguish between said first and second received signals, either separately, or in combination with the raw signal domain and its linear transformations.

The method preferably comprises defining a plurality of time frames corresponding to a sampling window and further defining a matrix of impulse responses, with impulse responses for adjacent time frames adjacent to each other. In such a matrix objects will be represented by patterns corresponding to the impulse responses arising from reflections from those objects in successive time frames.

The matrix could be a logical construct comprising data recorded in a memory or other storage medium of a computing device; equally it can be seen as an image, with the values of the matrix corresponding to brightness levels in the image. The sampling scheme and so matrix is preferably rectangular, however this is not essential. It could be a different shape such as hexagonal or the heights of adjacent columns may vary (i.e. the length of the sampling window may vary), not necessarily according to any simple geometric pattern. In general the matrix is made up of samples of the impulse response at different times, where the impulse response is itself a function of time.

The Applicant has realised that by organising the impulse responses such that they can be represented as an image (whether or not they in fact are so represented), powerful analysis of the image can be employed to deduce useful information about the object(s) such as presence, movement and changes in shape, size, orientation etc. When such analysis is discussed hereinbelow reference will be made to impulse response images; however it should be understood by those skilled in the art that such analysis can equally be carried out on data in a matrix, whether it is stored as such or whether it is a purely logical construct, and that nothing herein should be construed as inherently limiting the invention to requiring production of an actual image or any other representation.

In some known systems object tracking is carried out by comparing consecutive pairs of reflected signals (e.g. by comparing their phase) This can be thought of as the "raw signal" domain. The Applicant has appreciated however that by carrying out tracking, or motion characterisation more generally, in the impulse response image domain in accordance with some preferred embodiments of the invention, significant advantages can be realised. For example there is less of a requirement to separate a large number of small pulses or to find leading edges of waves than there is when operating in the "raw signal" domain. The preferred embodiments of the invention allow an overview of a 'scene' to be taken which then allows better qualified estimates to be made of the identity of parts of the image with the particular objects and their movement, as opposed to simply carrying out a 'search' operation at any given time.

Uses of the principles disclosed here are not confined to tracking but encompass gesture recognition (e.g. a sweep of a hand from left to right) where accurate coordinate determination is not necessarily required.

The patterns in the impulse response 'images' corresponding to objects and their movement will typically be made up of the impulse responses from a number of consecutive time intervals. This allows more accurate and reliable analysis of trends within the image, which in turn allows reliable identification, location and/or tracking of objects. In some embodiments of the invention the impulse response images allow multi-frame motion estimation to be conducted—that is motion estimation where motion is not simply computed from frame-to-frame and then possibly averaged over the frames, but rather wherein the motion is computed using several frames right from the start.

Impulse response images also allow motion estimation where possible movements are computed for multiple objects and/or multiple pixels within a single object, whether it is computed for pairs of impulse response or for multiples: multi-pixel/multi-candidate motion estimation. Such motion estimation may use impulse response samples from two or more consecutive time frames. In practice, the Applicant's research has shown that different points on the surface of the object can have different motion patterns due to the size and orientation of the object. If, for instance, a hand is moving along a straight line with constant speed closely in front of a receiver/transmitter setup, a reflective point or partial object on one side of the hand does not have the same series of distances to the receiver/transceiver setup as a point or a partial object on the other side does.

Whether in accordance with the invention a single object of interest or multiple objects are observed and/or tracked, the previously-mentioned impulse response images permit the use of line filters, as described in greater detail in WO2009/115799, which allows movements of the input object(s) of interest to be determined.

In accordance with the invention there may be more than one object of interest or the object of interest could change during tracking. For example the movement of two hands could be tracked.

The initial signal could take any desired form. Preferably it is periodically repeating. The repetition period defines a time frame which typically corresponds to the impulse response sample period—that is the 'slices' which are used to construct the impulse response image. The signal within each time frame could take any form. In a simple embodiment it could comprise a single impulse or spike, i.e. approximating a Dirac delta function within the limitations of the available bandwidth. This has some advantages in terms of requiring little, if any, processing of the 'raw signal' to calculate impulse responses (in the theoretical case of a pure impulse, no calculation is required). It also allows for easy computation of cross-correlations between consecutive pulses since the impulse response matrix is very sparse (i.e. is mainly zeroes). However narrow pulses give a poor signal-to-noise ratio because of the deliberately short transmission.

In other embodiments the signal could be a series or train of pulses. This gives a better signal-to-noise ratio than a single pulse without greatly increasing the computation required. Moreover it allows simple amplifiers to be used since a high degree of linearity is not required. Another possibility would be to use a signal which might be at a constant frequency but in which the phase of the signal varies cyclically—e.g. in a pattern which changes each time frame. In other embodiments the signal comprises one or more chirps—i.e. a signal with rising or falling frequency. These give a good signal-to-noise ratio and are reasonable for calculating the impulse responses using a corresponding de-chirp function applied to the 'raw' received signal. More generally a random or pseudo-random signal could be used. The signal could fill the time frame—so that transmission is continuous—or be shorter than the time frame so as to transmit discontinuously.

Similarly, the second device may be configured to transmit in any of these ways, or any other suitable way. In some circumstances it is envisaged that the first and second devices are configured to transmit the same type of signals. It will be appreciated that the potential for interference is particularly high in such circumstances.

The patterns in the impulse response image or matrix will of course be affected by the time shift function applied to the transmit signal. However this can be used to avoid confusion between objects at different ranges. One way of doing this will be described below.

The range-dependent effect of the time-shift function on the received signals can be used by itself to distinguish between objects and/or devices. In preferred embodiments however in which impulse responses are calculated, an inverse of the time-shifting function is applied to the calculated impulse responses. The order of applying the inverse, calculating the impulse responses and constructing an impulse response image is not essential. For example the inverse can be applied to the columns of the impulse response image, i.e. in 'image domain', or as an intrinsic part of the impulse response estimation process.

When applying the inverse function it must be decided what time delay to use between the time-shift function applied to the transmitted signals and the inverse function applied to the received signals. This time delay equates to an assumption as to the time of flight of the received signals. Received signals that fit with the assumption will therefore have the effect of the time-shift function substantially cancelled, whereas those that do not fit with the assumption will not have this effect cancelled. The result is effectively to 'focus in' on a particular range, bringing greater clarity to impulse responses from the range in focus at the expense of impulse responses from other ranges and from other sources such as the second device (whether received along a direct-path or reflected off other objects including walls and ceiling).

In the context of impulse response images the time-shift function adds additional structure to lines representing objects, whereas the inverse function removes that structure again, but only for those that fit with the range and transmission-source assumption. The range assumption in the context of impulse response images equates to a decision as to whether the time of flight is within the sampling window, represented by a time frame, or within two time frames, three time frames etc. After application of the inverse function, impulse responses for objects within the 'focal range' will be relatively well-defined lines—e.g. straight horizontal lines if the object is stationary. Impulse responses for out-of-range objects will by contrast still be more 'smeared out' depending of course on the nature of the time-shift function applied. Similarly, impulse responses for signals arising from another device (which is not transmitting signals according to the same time-shift function) will typically be 'smeared out'.

Thus knowledge of the pattern of variation applied to the transmit signal, i.e. the time-shift function, can be used to separate the echoes from a near object from those from a far object since the corresponding pattern of the echoes from the far object will exhibit a shift in time compared to those from the near object (due to the longer time of flight) and a similar effect can be used to distinguish between signals arising from multiple devices. This shift between the patterns of the impulse responses for near and far objects could be analysed directly using a suitable technique but by applying the inverse function, such analysis is much easier. For example relatively simple filters might be used.

The 'focussing' described above can not only be used for the object of interest or one of the objects of interest but also for background objects. This effectively allows a background object to be identified which then allows it to be accounted for, e.g. by subtraction, a weighting function or simply ignoring it, when tracking an object of interest.

Any suitable pattern of variation could be used for the time-shift function for the first device, for example a simple periodic pattern, such as a sine wave, square wave or saw-tooth pattern. The second device may also use a time-shift function which may be of any suitable pattern. So to take a simplistic example of a regular chirp and a sine wave variation, without applying any of the methods in accordance with the present invention, each transmission might be made at the same point in its time frame (the time frames being of equal length). In this example embodiment of the invention however transmissions would be made at different points within the respective time frames, so that the interval between given transmissions varies with time in the sine wave pattern.

Preferably however a more complex time-shift function is used—e.g. one based on a pseudo-random sequence. Such a sequence might be effectively non-repeating (over any practicable timescales), or might repeat on a relatively short period—e.g. every 5 to 50 frames; e.g. every 30 frames. Where both devices use a pseudo-random sequence, these may be seeded by predetermined device-specific seeds, such as unique serial numbers, or may be based on a seed such as the time since they were powered on, which is likely to differ between the devices. In a set of embodiments the time-shift function does not repeat within a time period equal to or greater than the round-trip time-of-flight for the most-distant anticipated echo (which may be calculated using the dimensions of a room in which the apparatus is being used, for example). Alternatively, a true random sequence may be used (derived, for example, from a source of radioactive decay); however, in this case the inverse shifts to be applied to the received signals will have to be calculated from the sequence of random time shifts, since corresponding inverse shifts cannot be independently calculated.

The use of a more complex time-shift function is advantageous as it gives the corresponding impulse responses the characteristics of general noise, but of course with the advantage that the exact pattern of the 'noise' is known. This allows the inverse to be applied to produce a 'clean' impulse response for an object from the desired range but the impulse responses from outside the range will still have general noise characteristics after application of the inverse. In particular, if the second device also uses a complex time-shift function, signals arising from its transmissions may appear as noise to the first device. This makes it relatively easy to filter them out using general noise reduction filters and the like.

Sometimes it will occur that old reflections from far-field objects will happen to overlap reflections from a near-field object—because the objects are separated by an exact multiple of the time frame length. In its preferred embodiments the invention makes it easier to separate the reflections—e.g. by reinforcing the wanted reflection and 'smearing out' the unwanted reflection. Similarly, it will sometimes occur that a transmission from the second device overlaps a reflection from an object of interest at the first device. However the Applicant has also devised a beneficial technique that can further improve separability of wanted and unwanted impulse responses in this situation. A set of preferred embodiments therefore comprises the first device changing the length of the time frame of the initial signal between two adjacent frames. Taking the example of a periodic pulsed initial signal, this would equate to changing the 'base' time between pulses, as well as, in accordance with the time-shift function, changing the timing of the individual pulses relative to the base. Changing the time frame length also changes the number of samples per window and so the length of a column in the impulse response image.

The change in frame length could occur just once or a plurality of changes could be applied. A plurality of changes could be made automatically, but in some preferred embodiments changes to the frame length are made when required to resolve two superimposed echoes, perhaps arising from different devices. Thus the time frame length can be automatically progressively changed until a satisfactory separation of two images has been achieved.

Where the initial signal is discontinuous (i.e. the signal does not fill each frame) the change in frame length might be accommodated by having shorter or longer gaps. Where the initial signal is continuous, changing the frame length requires a change in the initial signal itself (either adding a portion to each time frame to match a lengthening; or removing a portion to match a shortening) but this can easily be accommodated—e.g. by having a bank of codes, one for each frame length.

The 'focussing' technique outlined previously effectively allows better spatial resolution since it allows an increase in the update rate, corresponding to a reduction in the spatial range corresponding to a sampling time frame. However with these methods the reflections from different time frames can be resolved rather than being ambiguously superimposed on one another.

As mentioned above, in some embodiments, techniques for identifying an echo from an object of interest can be applied to echoes from other objects. By identifying such echoes, they can be more effectively compensated for or disregarded when analysing an echo pattern containing an echo from the object of interest. This 'background object' identification could be carried out in a separate phase, e.g. an initiation or setup phase, or at the same time that a target object is being tracked.

Thus in some preferred embodiments, the methods of the invention further comprise the step of identifying a contribution to the second received signals from an object other than an object of interest. For example the impulse responses corresponding to the reflections from a non-target object could be subtracted from an impulse response image.

The subtraction may comprise applying the inverse of the time-shift function to the impulse response image such that reflections from a static object in a first time-of-flight range would be represented by a predetermined line in the image, applying a filter to determine the presence of an object not being a target object, subtracting from the impulse response image a contribution related to the non-target object.

Alternatively, in embodiments in which the time-shift repeats regularly, the subtraction may comprise comparing two blocks of impulse response columns, separated from one another by the period of the time-shift repeat, identifying a pattern that is present in both blocks and subtracting that pattern from the impulse response image. The pattern may be subtracted from the image every time-shift repeat. In a set of embodiments the two blocks and the pattern are the width of the time-shift repeat. In this way, reflections from static objects, and any other source of constant of background noise, can be removed from the impulse response image. This approach can be employed to remove interference from the second device where it has regular transmissions (i.e. not dithered according to a time-shift function).

Alternatively, a single moving-mean (rolling-average) impulse response column may be calculated. Such a column could be updated periodically (preferably every time frame) by vertically shifting two or more columns of impulse response taps with respect to one another by a vertical shift amount and calculating the mean of the two aligned columns. The moving mean column can then be subtracted from the impulse responses, e.g. once every time frame or matrix column. The vertical shift amount is preferably determined from the inverse time shift function. This would have the effect that a static object in a time-of-flight range of interest (the 'depth' of the range being equal in time to one time frame) would be represented at the same vertical position in each column. This is an alternative approach to that described in the preceding paragraph, but can give similar results.

In the arrangements described above, instead of simply subtracting parts of the signal or impulse response relating to unwanted echoes, a weighting function could be used instead to give a different weighting to the parts identified as corresponding, or likely to correspond to, unwanted echoes.

Of course in practice the received signals will be subject to a certain degree of real noise. In preferred embodiments a low-pass filter is applied to the impulse response images after the inverse time-shift function has been applied. This helps to filter out reflections from other objects and a proportion of the real noise. Of course rather than applying an inverse function followed by a low-pass filter a customised filter could be applied that was effectively equivalent to this.

In a practical situation, all or some of the reflecting objects are likely to be moving. The result will thus be that the lines in the impulse response images (after application of the correct inverse function) would not be horizontal, but rather would be e.g. at an angle to the horizontal dependent on velocity in the direction of the reflection. In such cases, a band-pass filter in the horizontal direction, or a general two-dimensional band-pass filter, could be employed which would allow for some divergence from a horizontal and/or straight line whilst still allowing an object to be tracked. In some preferred embodiments however the motion is preferably detected, and an appropriate line filter, aligned with the direction of movement of the object applied. The motion could be detected by analysis of the received signals—e.g. using a gradient detection algorithm, or by another method—e.g. using Doppler shift.

The use of a filter such as a line filter as outlined above is beneficial, since it is typically designed to span multiple transmit signals. This means that it is not overly susceptible to a single frame being missing, too noisy or otherwise distorted by interference. This will be described in more detail.

In contrast to employing a "track-then-smooth" principle, such as when extracting two successive time-of-flights and then averaging or locating a trend in this pattern, the use of one or more line filters can be seen as a "smooth-then-track" approach. When, as is preferred in some contexts, a set comprising multiple line filters is used, and the best match selected, the line filter set can jointly be seen as a specific kind of adaptive filtering; i.e. a kind of filtering which alters its nature in response to what is passed through it.

In this case, the adaptive filter is tailored to the application and the underlying hypothesis that the object-of-interest follows a linear trend, whereas the object which gives rise to interference, due to the scattering of its echo profile around the baseline, follows a non-linear, scattered trend, to which the line filters give no or little response. Scattering of the echo profile of the source of interference around the baseline is achieved by the time shift function applied as is described hereinabove.

The combination of two things in some preferred embodiments: namely the use of a time shift function to scatter the echoes from a source of interference around a base transmission frequency, and the use of one or more line filters to selectively pick up those trends which are continuous (i.e. linear or curvilinear) whilst leaving out the scattered interference, jointly produce a robust approach for tracking and for gesture recognition in multi-device applications.

It should be noted in particular, that when echo signals from a secondary device are scattered, the line filter approach just described becomes strongly preferable over a more conventional point-to-point tracking method, followed by smoothing or trend analysis. This is because a point-to-point tracker (i.e. one extracting successive time-of-flight estimates or differential time-of-flight estimates) may fail properly to recognise the object of interest: If the interfering source has resulted in scattered echoes which are comparable in strength to or stronger than the echoes from the close-range object of interest, a point-tracker may end up only or partly tracking the source of interference rather than the object-of-interest. A line-filter-based tracker, however, will tend to effectively filter out those interfering components, simply on the ground that the 'basis' spanning the set of line filters does not match well with the source of interference.

The example above is described in terms of a second interfering device producing a "scattered" echo, i.e. one which varies its pattern around a base frame rate. However the above principle could also work well if the second device was instead coded with a different transmission code. The use of a decoding sequence, whether a decorrelator or an inversion based decoder, would effectively "smear out" the interfering signal rather than scatter it. Nevertheless, the same argument regarding the usefulness of the line filter, i.e. in effectively removing the smeared, distorted interfering signal by using a line filter, applies.

The process of detecting the line of motion and filtering with respect to it is, in some sense, a circular problem, since to filter in the line of motion requires knowledge of the line of motion, and this knowledge stems from roughly at least, successfully tracking the curves. Nevertheless, in many practical situations, enough information about the main motion tendencies can be extracted from the images without prior knowledge.

The Applicant has appreciated that with an appropriate choice of time-shift function, the 'noise' added to reflections which are not in the focus range can be made to resemble apparent movement of the reflecting object which is not physically possible or within the predefined boundaries for expected objects. For example, for a hand tracking system, movements upper bounds can be placed on speed and acceleration. These upper bands can be quite low given the physical characteristics of hand movements. Thus some preferred embodiments comprise determining a motion characteristic, such as speed or acceleration, implied by a particular impulse response and comparing said characteristic against a threshold or set of expected characteristics and disregarding or removing/filtering out the corresponding part of the impulse response if no positive match is made.

Similarly in some preferred embodiments the expected set of real movements comprises only low-frequency components in the horizontal direction of the impulse response image, thus some preferred embodiments comprise applying a Fourier transform, e.g. a fast Fourier transform to the impulse response image obtained after the inverse of the time-shift function has been applied. Thereafter a test can be applied depending on the frequency composition of a candidate portion of the impulse response image to determine whether or not it relates to an object of interest.

In a set of preferred embodiments the methods described herein are used to track the motion of a human hand or part thereof. Preferably this is used to control an electronic device, including but not limited to a device with a visual display, such as a computing device, mobile device, cell phone, PDA, laptop computer, desktop computer, television, music system, video camera, or any device, static or portable performing any combination of these or other functions. One particular, non-limiting example is tracking the movement of a user's finger to control a cursor on a computing device or other device with a graphical user interface (GUI).

In one set of particularly preferred embodiments a method in accordance with the invention comprises the step of identifying a hand gesture. There are many possibilities for these gestures—a few examples of which will be given below. It will be apparent however to those skilled in the art that there are many possible alternatives which the principles and advantages that can be achieved in accordance with embodiments of the invention make convenient or possible.

The first device may be a static device such as a desktop computer, but is preferably a portable device such as a mobile phone, PDA, games console, bar-code reader or satellite navigation unit. Similarly, the second device may be static but is preferably portable.

The first device preferably comprises an acoustic transmitter, such as a moving-coil loud-speaker or piezoelectric transducer, and an acoustic receiver or microphone. The transmitter and receiver might be the same component but are preferably separate and spaced apart from each other in order to facilitate motion characterisation. The device may have a plurality of transmitters and/or a plurality of receivers forming a plurality of distinct transmitter-receiver pairings or channels.

In some embodiments, one or more of the transmitter and receiver comprises a plurality of transducer elements forming an array, which may use beam-forming techniques on the transmitted and/or received signals.

The means for configuring the transmitter, processing means, control means, and means for using received signals recited herein preferably comprise one or more general-purpose microprocessors configured by software (shared between them or separate), but may alternatively or additionally comprise dedicated logic, such as an application-specific integrated circuit (ASIC). The means for determining the presence of a second electronic may comprise logic, such as a microprocessor or ASIC; it may further comprise a receiver, such as the aforesaid acoustic receiver or another receiver, e.g. an additional acoustic receiver or a receiver for RF, IR, etc.; it may comprise a user-interface for the user to indicate the presence of the second device—e.g. a graphical user-interface (GUI) button.

Time-of-flight analysis of signals on each channel can enable tracking of the object by ellipsoid intersection calculations, as is well known to the skilled person. Alternatively or additionally, less precise motion characterisation such as gesture-detection may be performed. For example, a movement of a user's hand from left to right in front of the device may be detected, and an appropriate user interaction initiated in response. Such gesture recognition may not necessarily require triangulation or trilateration calculations, but could be undertaken using a more general pattern-matching approach. The device may support multiple different motion characterisations approaches, and the present invention is not limited to any particular type of motion characterisation.

In some embodiments the first and second devices are the same type of device; in particular, they may contain a motion characterisation subsystem operating to the same design specification or standard as each other. In some situations, the first and second devices and made by the same manufacturer and may be the very same model of device as each other.

As mentioned previously, using signals received by the first device after the adjustment to characterise the motion of the object may comprise tracking motion of the object in space or may comprise determining which of class of motions (for example, arm gestures) the motion of the object best fits. It may further comprise determining a position estimate of the object.

Generally, the nature of the transmit signals can be selected as appropriate. In a simple embodiment they comprise impulses or spikes, one within each time frame, i.e. approximating a Dirac delta function within the limitations of the available bandwidth. This has some advantages in terms of requiring little, if any, processing of the 'raw signal' to calculate impulse responses (in the theoretical case of a pure impulse, no calculation is required), but it gives a poor signal-to-noise ratio because of the deliberately short transmission.

In other embodiments the signal transmitted from the first device within a time frame is composed of a series or train of pulses, having a regular or irregular period. This gives a better signal-to-noise ratio than a single pulse without greatly increasing the computation required; a cross-correlation function can then be efficiently applied to the processed received signal due to the presence of many zero-multiplications, which can be excluded from any multiply-and-accumulate steps.

In yet further embodiments the transmit signals comprise one or more chirps—i.e. a signal with rising or falling frequency. These give a good signal-to-noise ratio and are reasonable for calculating impulse responses using a corresponding de-chirp function applied to the 'raw' received signal. Calculating impulse responses (i.e. the theoretical response of the channel to a pure impulse) is advantageous in certain embodiments; however it is not essential to all embodiments of the invention.

In a set of embodiments the transmit signal comprises a band-limited white code such as a chirp with limited frequency band.

The transmitted signals from the first devices may be continuous (e.g. time- or frequency-coded) but are preferably discrete (i.e. the emissions include periods of silence). Where the signals from the first device are continuous or substantially continuous, they will still correspond to regular time frames by having a periodic characteristic, such as a frequency sweep, that occurs at the first frame rate.

In preferred embodiments, the first device transmits one signal within each time frame; preferably occupying only part of the frame length. In some embodiments, this signal comprises a linearly-rising chirp followed by a linearly-falling chirp; this facilitates cross-correlation and is relatively robust to Doppler shift, while having a higher signal-to-noise ratio than a simple pulse.

The first device preferably calculates an impulse response from the received signals. Preferably successive impulse responses are calculated corresponding to successive frames.

The second device may be any device causing acoustic interference; however, in preferred embodiments it is another device arranged to transmit acoustic signals for motion-characterisation purposes.

The second device may transmit signals in any of the ways mentioned above with reference to the first device. The signals from the second device need not be of the same type as those from the first, but preferably, the second device transmits signals that have substantially the same base frequency or frequency range as those transmitted by the first device. It is envisaged that the invention may prove particularly useful when the second device transmits signals having substantially the same frequency, shape and/or coding schema (if any) as those transmitted by the first device, where the potential for interference leading to false motion characterisation by the first device is relatively high.

In some embodiments, the first device (and optionally also the second), transmits a discrete signal at substantially the same time within each time frame. However, in other more-preferred embodiments, a discrete signal is transmitted within each time frame at a variable offset that varies according to a time-shift function. In this way it is possible for the device to distinguish between echoes occurring from objects at different ranges (where a range corresponds to the distance traveled by sound to and from the device in a single time frame), which might otherwise cause confusion. This approach can also be used to discern signals stemming from different devices. In such embodiments there will be a continually changing instantaneous frame rate and thus references herein to the frame rate should be understood as references to the base, average or underlying frame rate.

Although the invention has so far been described with reference to interference from a second device, principles of the invention are also applicable to sources of interference more generally, and thus, from a further aspect, the invention provides a method of characterising the motion of an object comprising:

transmitting acoustic signals from a device in regular time frames at a frame rate;
receiving acoustic signals at the device that comprise reflections of the transmitted signals from the object;
processing the received signals on the first device and detecting interference not arising from the transmitted signals;
adjusting one or both of:
  a) the frame rate; and
  b) the length of a fixed number of frames,
so as to reduce the interference in subsequently received signals; and
using said subsequently received signals to characterise the motion of the object.

The invention extends to a device for characterising the motion of an object comprising:

transmission means adapted to transmit acoustic signals in regular time frames at a frame rate;
receiving means adapted to receive acoustic signals comprising reflections of the transmitted signals from the object;
processing means configured to process the received signals and to detect interference not arising from the transmitted signals;
control means configured to adjust one or both of:
  a) the frame rate; and
  b) the length of a fixed number of frames,
so as to reduce the interference in subsequently received signals; and
means for using said subsequently received signals to characterise the motion of the object.

The invention also extends to a computer software product, and to a carrier bearing the same, configured, when run on a computer, to characterise the motion of an object comprising:

instructions for transmitting acoustic signals in regular time frames at a frame rate;
logic arranged to process received acoustic signals comprising reflections of the transmitted signals from the object and to detect interference not arising from the transmitted signals;
logic arranged to adjust one or both of:
  a) the frame rate; and
  b) the length of a fixed number of frames,
so as to reduce the interference in subsequently received signals; and logic arranged to use said subsequently received signals to characterise the motion of the object.

Thus it will be seen by those skilled in the art that, according to this aspect of the invention, the device adjusts the frame rate or length of a fixed number of frames (thereby giving an offset) so as to reduce interference detected as arising from an external source.

Adjusting the length of a fixed number of frames to give an offset can be effective whenever the source of interference has a periodic component at the same frequency, or an integer multiple of, the frame rate, since it can shift the received noise away in time from the received reflections from the object of interest.

The interference may, as before, be caused by a second motion-characterising device, but it might be an item of mechanical equipment, such as a ventilation fan, or electrical equipment, such as fluorescent lights, a television set, or an ultrasonic communication device or identification tag.

The device preferably implements preferred features described above with reference to the preceding aspects. It is not envisaged that the device will here attempt to communicate with the source of interference, although it is not excluded.

The transmissions in accordance with any aspect of the invention are preferably ultrasonic—i.e. preferably sonic waves with a frequency (or median frequency) greater than 20 kHz, preferably greater than 30 kHz.

In all of the methods herein, the results may be stored in a volatile or non-volatile memory. Additionally or alternatively they are displayed on a display device. They could comprise the step of providing a display signal for a display device.

Additionally or alternatively the methods are used to control a device. They thus could comprise the step of providing a control signal for an said device.

The methods of the invention are preferably carried out using computing means, computing machines, data processing apparatus or any other device capable of carrying out stored instructions. Such a device may be static; although the invention can equally be used with mobile devices. Indeed the advantages achievable in accordance with at least some embodiments of the invention make it particularly suitable for use in mobile devices, for which the sudden appearance of interference from another device is especially likely. Although certain aspects have been described with reference to steps carried out by one or more device, it will be appreciated that one or more of these steps may, in some less-preferred embodiments, be carried out on a remote processor, such a network server, which is in communication with the device (e.g. over an RF channel); such arrangements are within the scope of the present invention.

Any of the definitions and features, optional or otherwise, described herein in the context of one aspect of the invention may, where appropriate, be applied to any of the other aspects also.

Certain preferred embodiments of the invention will now be described, by way of example only, with reference to the accompanying drawings, in which:

FIGS. 3, 4a, 4b, 5 and 6 are diagrams illustrating various timings of transmitted and received signals;

Figure 1:
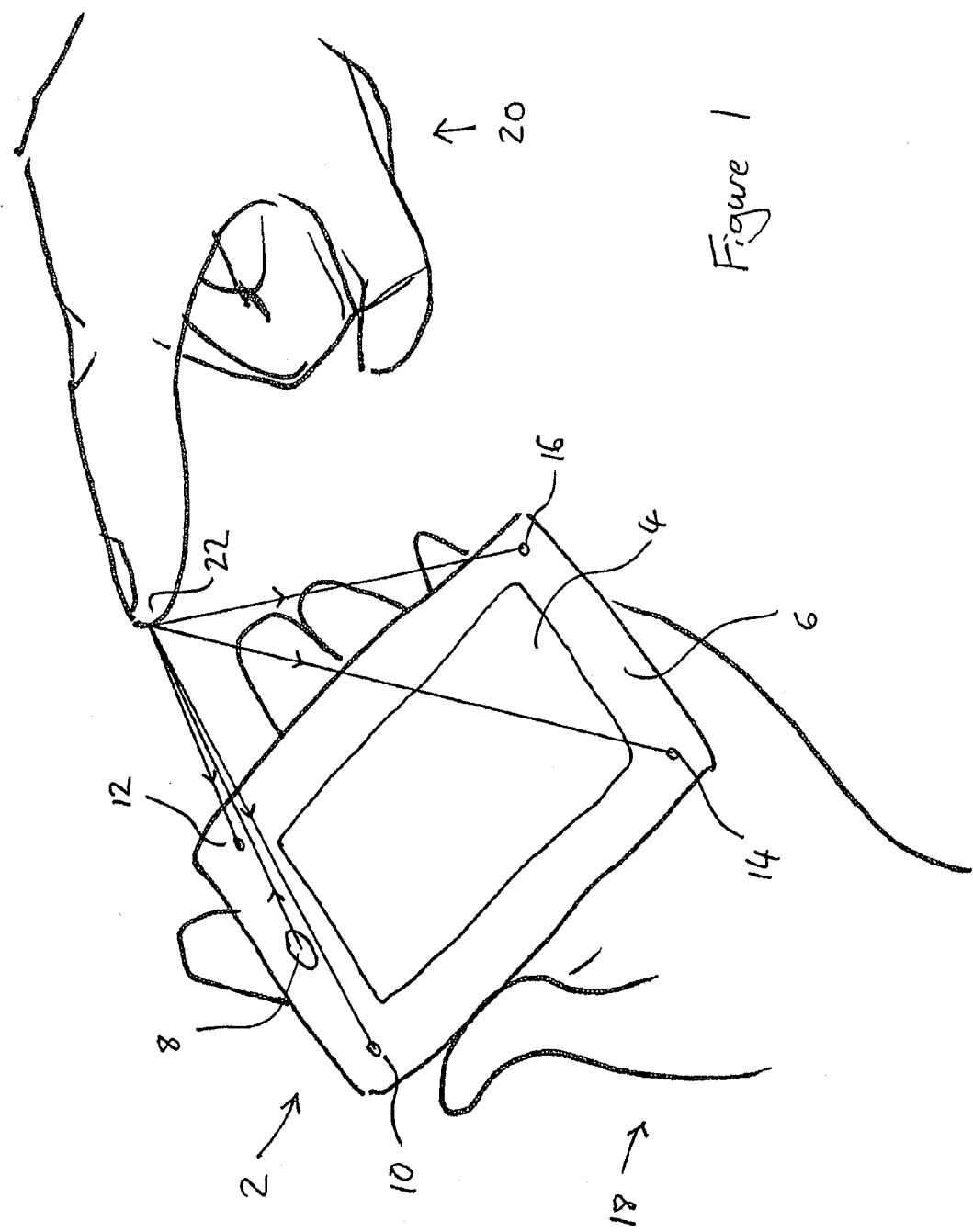
FIG. 1 is an perspective drawing of a handheld device.

FIG. 1 shows a handheld device 2 having a substantially rectangular LCD or OLED screen 4 mounted in a surrounding frame 6. Inside, the device contains well-known processing and communications systems to control the functioning of the device and to interface with the user. Mounted flush with, or recessed into, the surface of the surrounding frame 6 are an ultrasonic transmitter 8 (such as a loudspeaker or piezoelectric transducer) and four ultrasonic receivers located in the top-left 10, top-right 12, bottom-left 14 and bottom-right 16 corners of the device. The transmitter 8 and receivers 10, 12, 14, 16 are connected to associated circuitry and components, such as analogue-to-digital converters, amplifiers, etc. so as to enable their control by one or more digital processors inside the device. These transmitters and transducers may also be used for speech and other audio functions, thereby saving cost. For example, the loudspeaker could be a Hibox HB18E, manufactured by Hibox, Taiwan which has been found to be successfully useable for both speech and ultrasound transmissions. Similarly the microphones could be Sonion SiMic, manufactured by Sonion, Denmark, which have sufficient bandwidth for both acoustic domains. It will be appreciated that other devices may have more transmitters and more or fewer receivers and these need not necessarily all be mounted in a plane, but some could be on an edge or the reverse face of the device.

In use, the device 2 would typically be held in a user's left hand 18 with the display 4 angled towards the user's head (not shown). The user then moves his right hand 20 in the space between the display 4 and his head to effect input signals to the device that cause it to respond in appropriate ways. Of course, equally the right hand may support the device and the left hand be used for input.

The user's input hand 20 may be in any suitable configuration such as a fist or with the fingers all substantially parallel. However in FIG. 1, the user's index finger is extended so as to provide a natural pointer at the tip 22 of the finger.

To characterise the motion of the fingertip 22 (which may be to determine a precise coordinate in space, or which may be to identify a particular gesture from a set of possible gestures), a sequence of ultrasonic chirps is transmitted from transmitter 8 at a frame rate, with intervals of silence between each pair of chirps. Other types of transmit signal may of course be used, and the device may be capable of switching between two or more different types of signal or coding scheme, depending, for example, on the mode of operation, or on the level of background noise. Different chirps may be coded for different receivers, so that every first, second, third and fourth chirp is specific to the top-left 10, top-right 12, bottom-left 14 and bottom-right 16 receiver respectively.

The transmitted chirp propagates substantially hemispherically from the transmitter 8. One part of the wavefront hits the fingertip 22 of the user's input hand 20, from which it is reflected in many directions. A part of the reflected sound is received by each of the four receivers. Although FIG. 1 shows only a single sound path, it will be understood that sound strikes all parts of the fingertip 22 that are in direct view of the transmitter 8, and that each receiver receives sound from many parts of the fingertip 22 at slightly different moments. The receivers are omnidirectional such that each receiver also receives sound from reflections off other parts of the input hand 20, and potentially from other objects in the environment. Unlike an optical camera, which is directional and constructs an image from received light, in the present device, each receiver receives overlaid sounds from different directions without necessarily having any obvious mechanism to distinguish between the directions. This enables a wide field of view from a flush-mounted transducer, but also presents a challenge in processing the received signals to distinguish reflections from an object of interest from reflections from other objects and from signals from other devices.

Figure 2:
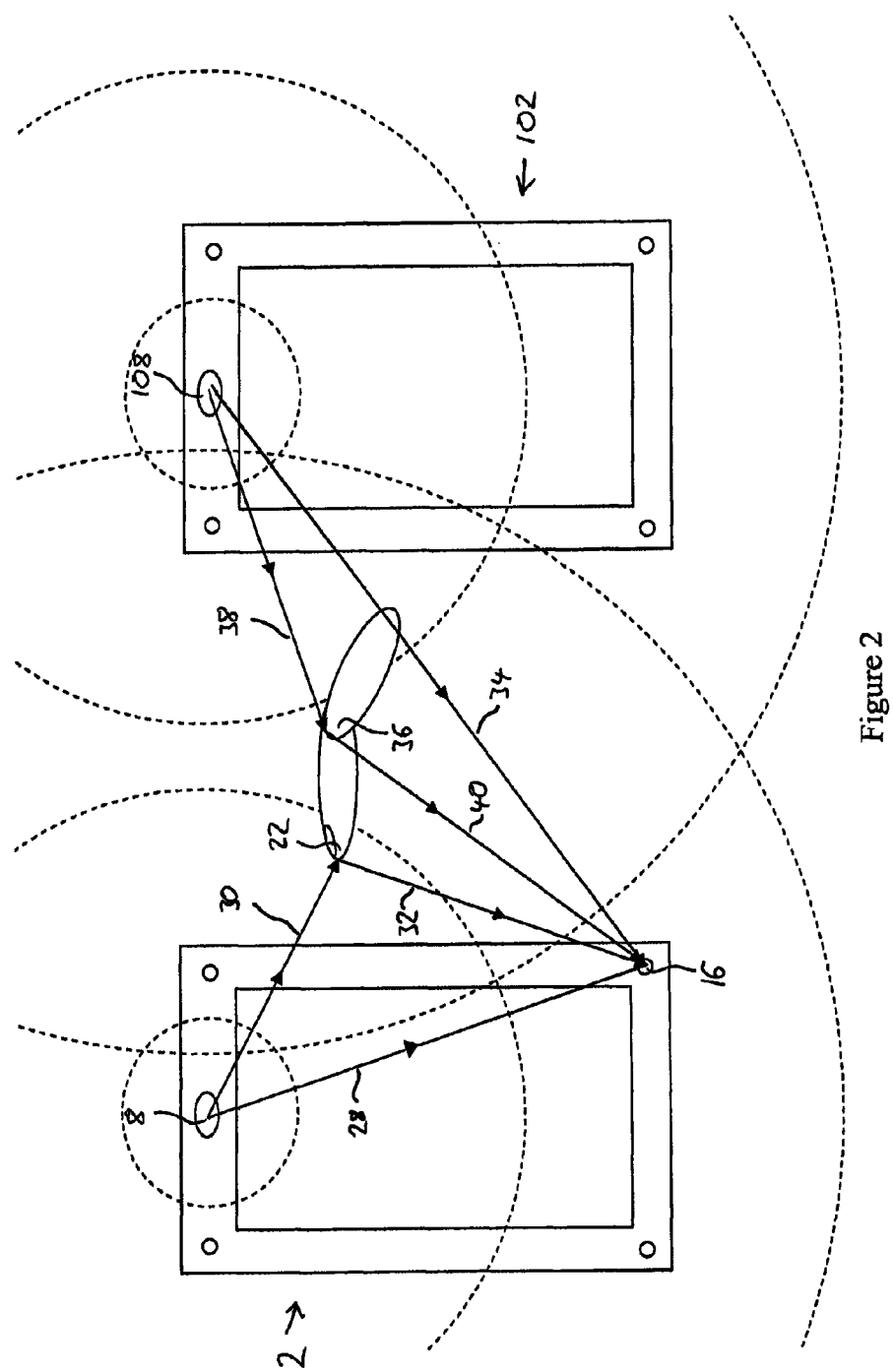
FIG. 2 is diagram showing the handheld device in proximity to a second handheld device.

FIG. 2 shows a second device 102, functionally identical to the first device 2, in the same room as the first device. It has equivalent transducers, including an transmitter 108. A user is interacting with the first device 2 via his fingertip 22, as described above. The second device 102 is also in an active state, and is transmitting ultrasound from its transmitter 108. Thus, as well as receiving reflections from the fingertip 22, the first device 2 is also in range of signals transmitted from the second device 102. Taking the bottom-right receiver 16 as an example, as before it receives a direct-path signal 28 from the first device's transmitter 8 and a reflection 32 of sound following a path 30 from the first device to the fingertip 22. It will also receive reflections off other parts of the user's hand. With the presence of the second device 102, it now also receives a direct-path signal 34 from the second device's transmitter 108, as well as reflections off the user's hand of signals from the second device, e.g. sound following a path 38 from the second device to a knuckle 36 of the user's hand, and from there along a path 40 to the receiver 16.

In order for the first device 2 to be able to identify the reflections of its own transmitted signals from the fingertip 22, it must be able to distinguish between signals travelling along the various paths 28, 30-32, 34, and 38-40. The direct path 28 from its own transmitter 8 is easily filtered out due to the fixed, known path length. The other paths, however, are of variable length. The first device 2 uses timing-based approaches to distinguish between the various signal paths.

FIGS. 3-6 show examples of the signals received at the receiver 16 along the direct paths 28, 34 from the transmitters 8, 108 of the two devices when the first device is initially transmitting at the same frame rate as the second device (which may often be the case where both devices have the same default rate when first started up). Those signals received along the path 28 from the first device are represented by a solid vertical line; those received along the path 34 from the second device are represented by a dashed vertical line. The thin vertical lines indicate the boundaries between the regular transmit frames of the first device 2.

Although, for ease of explanation, only the direct-path signals are shown in these examples, the reflected signals from the first device 2 and the second device 102, while typically being more complex and spread-out over time, will nonetheless exhibit similar effects to those described with reference to the direct paths, and the same techniques are applied.

FIG. 3 shows the signals received when the first device 2 transmits a regular sound signal (e.g. a single chirp) at the beginning of each time frame. Each chirp is received 50a-50d at the receiver 16 after a short delay, determined by the distance between the transmitter 8 and receiver 16, and the speed of sound in air (which can be influenced by factors such as humidity, which may be measured and corrected for by the device in subsequent processing). The second device's chirps are transmitted and therefore received 52a-52d at the same frame rate as the first device's. Although the delay within each time frame appears to be only about twice that of the first device's signals, the chirps from the second device may in fact be delayed by several frames lengths in additional to the delay within each frame.

Because the two devices are transmitting at the same rates, the first device 2 is unable to determine whether the received signals 52a-52d from the second device 102 are reflections from an input object, such as the user's fingertip 22, or interference from another device.

FIGS. 4a and 4b show the effect of the first device 2 dithering, or time-shifting, its transmit signals within each time frame according to a random shift function. FIG. 4a illustrates the signals received along the direct paths 28, 34 at the receiver 16. The time-shift is seen in the random offsets of the received signals 54a-54d. The signals 56a-56d received from the second device 102, however, remain regular. FIG. 4b shows the effect after the device 2 has applied the inverse of the time-shift function to the received signals. Comparing this to FIG. 3, it can be seen that the interference from the second device 102 has been "scattered"; this would not have occurred in the same way to reflections from the user's fingertip along the reflected path 30-32, and the device 2 can therefore detect the presence of the second device 102. It may also apply a line filter to an impulse response image, or use averaging or a similarity-comparison between time-frames, or some other appropriate technique, to remove or reduce the influence of the signals 60a-60d from the second device 102 before further processing of the signals takes place.

FIG. 5 illustrates the effect of the first device 2 speeding up its transmission frame rate from the second frame onwards. For ease of understanding, the direct-path 28 signals 62a-62d are not dithered in this instance, but in practice they may still be; they continue to be received after the same delay within each time frame. However the signals 64a-64d continue to be received at the old frame rate. This can be used in two ways: first, the device 2 can notice a pattern of signals 64a-64d continuing at the old frame rate, and act to filter these out; secondly, without necessarily needing to notice this change, the signals along the two paths are naturally moved away from each within at least a proportion of the frames, which can result in less interference when the first device 2 attempts to determine the motion of the fingertip 22.

FIG. 6 shows the effect at the receiver 16 of a single frame of shortened length being inserted in the transmission sequence of the first device 2. After the shortened second frame, the transmissions continue at the previous frame rate. This has a similar effect of separating the signals 68a-68d from the second device 102 from those of the first device 2 as in FIG. 5, but, because the frame rates of the two devices remain the same thereafter, the separation between the later signals 66c, 66d from the first device 2 and those 68c, 68d from the second device 102 remains broadly constant. This means that, by choosing an appropriate length shortened frame, the first device 2 can lastingly displace the interference from the second device away from the signals it is attempting to characterise—e.g. the reflections from the fingertip 22. As the fingertip 22 moves, further one-off frame-length adjustments can be made to maintain the separation from the interference from the second device 102.

Figure 7A:
FIGS. 7, 8 and 9 are schematic diagrams illustrating in more detail how an embodiment of the invention works in principle.
Figure 7B:

FIGS. 7a to 7e show in more detail how a time-shift function can assist in dealing with interference from a second device. FIG. 7a shows that in the transmitted signal 70 the positions of the pulses 72a, 72b, 72c relative to the beginning of the frame change from frame to frame. This is the result of applying a time-shift function to an initial signal. It can be seen from FIG. 7b that there are impulse responses from the first transmitted pulse 38*a* in the first time frame but that in the second time frame there is also an impulse response arising from a transmission from another nearby device.

Figure 7C:
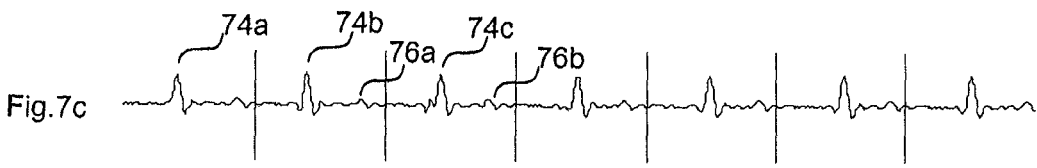
Figure 7D:

FIG. 7*c* shows the aggregate plot of the impulse responses from each of the modified series of pulses 72*a,b,c* and from the reflections originating from the second device. The strong, near-field reflections from the object 74 and the weak, reflections 76 from the nearby device can be seen in each time frame. Taking the second time frame for example, this includes a reflection 74*b* arising from the second pulse 72*b* being reflected from the object of interest and the interfering signal associated with the second device. However it can also be seen that in moving from one time frame to the next the separation of the first and second device reflections 74, 76 varies. This is shown more clearly in FIG. 7*d* when the resultant signal is chopped up in signal segments which are combined to become an impulse response image. The effect of the time-shift function can be seen on the first device's echo line 78 and the second device's echo line 46. The effect however is different on each line 78, 80 which is explained by the different time shift functions applied to the transmitted signals each line represents Because of this the lines 78, 80 are not parallel.

The time-shift function affects the lines 78, 80 in the impulse response image since the impulse responses are calculated as if the signal transmitted had been the original signal from the first device, i.e. before its time-shift function had been applied. Since movements from a flat line in an impulse response image would normally correspond to movement of the object from which the signals are being reflected, the effect of the respective time-shift functions can be seen as adding 'artificial movements' to the objects in question but with the actual movement for a given object being dependent on its position from the transmitter and receiver and the time-shift function applied to the transmitted signal it is reflecting.

Figure 7E:
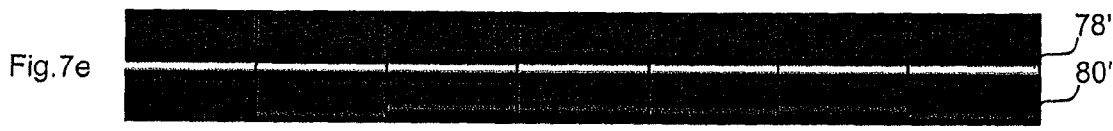

FIG. 7*e* shows the result of applying the inverse of the first device's time-shift function to the impulse responses with a delay equal to one time frame—i.e. based on the assumption that the reflection has come from an object such that its time of flight is within a single time frame. Now it is seen that the reflections which do come from the object near to the first device, consistent with the assumption, appear as a straight horizontal line 78'. This can be thought of as the reflection which is coherent with the inverse time-shift function. On the other hand the incoherent reflection line 46' resulting from reflecting a signal from the second device remains fluctuating (albeit in a different manner from prior to application of the inverse function). By applying for example a horizontal filter or a horizontal moving average filter to the image after this step, the first device signal (coherent) reflection would be strengthened and the second device (incoherent) one weakened. Thus the time-shift function allows the impulse responses from the reflections of different device's signals to be unambiguously resolved.

Of course, the description above is simplified for clarity of explanation. In practice many different, and more complex, initial signals could be used, for example a chirp or pseudo-random sequence. If for instance a chirp was applied, then the original signals could be regained by cross-correlating with this chirp. If say a signal other than a chirp were used, e.g. a pseudo-random code, then cross-correlation or inversion techniques such as those disclosed in WO 2006/067436 could be used.

The transmit signals from either device could even be continuous. The modification of the signal by the time-shift function would then be a continuous modification function, moving some portions of the signals forwards in time and some backwards.

In any case the time-shift function for either device needn't be a slowly varying smooth function, but could be pseudo-random. Indeed this is preferred since then variation of the line in the impulse response images is less likely to be confused with a genuine motion of the object of interest. Ideally therefore the time-shift function should correspond to an 'unphysical' motion.

Figure 8:
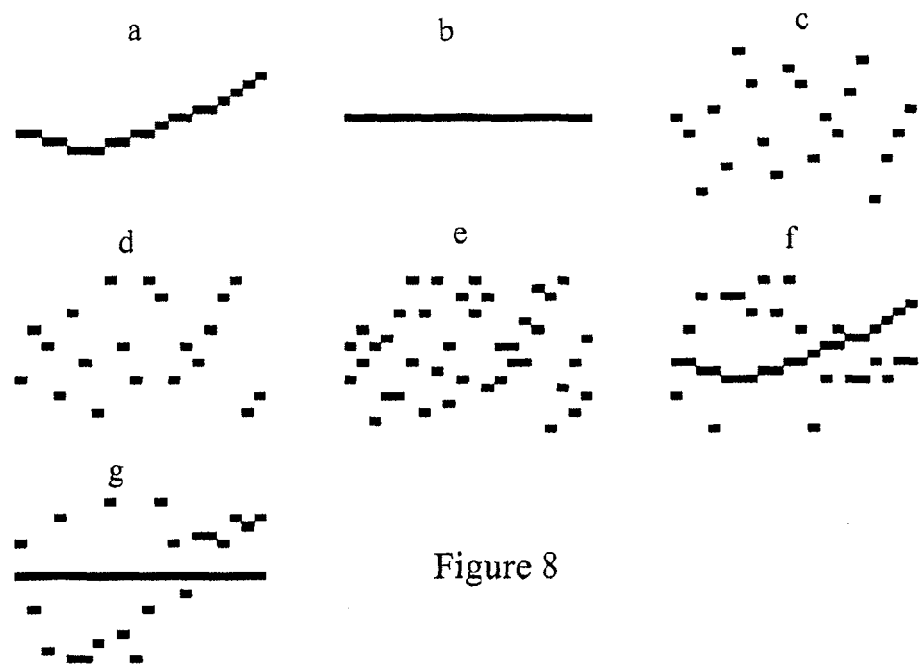

FIG. 8 illustrates through a series of impulse response image (IRI) fragments how the mathematics of the shifting and inverse shifting process is developed. For simplicity, schematic black and white impulse response images are used, indicating a set of situations where an object has no 'grading', i.e. there is a 0 in the impulse response if there is an echo, and 1 if there is one.

FIG. 8*a* shows the ideal impulse response image for a slowly-moving object as it would have appeared if focus was on this distance, and no other echoes were present. FIG. 8*b* shows an interfering signal, which relates either to reflections from a stationary object which is approximately one frame length further away than the object of interest yielding the IRI in FIG. 8*a*, or to a signal from another device that is using the same frame rate.

FIG. 8*c* shows the effect on the impulse response image in FIG. 8*a* of applying a time-shift function to the transmit signal. FIG. 8*d* shows the effect of the same function on the IRI of FIG. 8*b*. These can both be thought of as transformations of the images in FIGS. 8*a* and 8*b* respectively. If the image/matrix in FIG. 8*a* is denoted $I_1$, then the transformed image in FIG. 8*c* can be denoted $T_1(I_1)$. Similarly, if the image in FIG. 8*b* is denoted $I_2$, then the transformed image shown in FIG. 8*d* can be denoted $T_2(I_2)$. What will actually be observed by the impulse response image generation process is the superposition of the two:

$$T_1(I_1)+T_2(I_2)$$

This is shown in FIG. 8*e*. The reason why the two transforms $T_1(.)$ and $T_2(.)$ are different from one another is as follows: $T_1(.)$ effectively shifts the columns of its argument image according to the sequence pattern used for shifting, and this repetitive sequence can be denoted: $S\{1+(Q \bmod N)\}$, for any Q and with a sequence length N.

$T_2(.)$ on the other hand, in the case where the signals are reflections from a more-distant object, will shift the columns according to the sequence $S\{1+(Q+1 \bmod N)\}$. This is because the echoes coming from the further distance frame will relate to signals that were transmitted one time-step earlier, i.e. they are reflections of "earlier signals".

Having observed the superposition of images, the inverse transformation $T_1^{-1}(.)$ and $T_2^{-1}(.)$ can be applied to "focus in" on the relevant ranges. FIG. 8*f* shows the result of applying, the transform $T_1^{-1}(.)$, giving the resultant image $$T_1^{-1}\{T_1(I_1)+T_2(I_2)\}=I_1+T_1^{-1}\{T_2(I_2)\}$$

This follows from the linearity of the operator, apart from possible clipping at the tops and bottoms of the images, which here are assumed to be negligible. It will be seen that applying $T_1^{-1}(.)$ to the sum of the transformed images $T_1(I_1)+T_2(I_2)$ effectively focuses in on $I_1$ while adding a noise component which is a further scattering of $I_2$.

In FIG. 8*g* the opposite example is shown, where $T_2^{-1}(.)$ has been applied to the sum of the transformed images.

Next, filtering can be used to remove or reduce the echoes from a second range or transmission source when studying an acoustic scene with focus on the first range. In FIG. 8*a* the focused image $T_2^{-1}\{T_1(I_1)+T_2(I_2)\}=E+I_2$ is shown once again (i.e. it is the same as FIG. 7g). Here $E=T_2^{-1}\{I_1(I_1)\}$ is the scattering error term coming from applying a (non-matching) inverse T operation to the transformed $I_1$.

Figure 9:

Next, an outlier filter F(.) is applied to this image, removing any pixel that is not connected with two neighbours. The result is seen in FIG. 9b, which is now an estimate of the echo image from the second range or from the second device, i.e.

$$\hat{I}_2 = F(T_2^{-1}\{T_1(I_1)+T_2(I_2)\}) = F(E+I_2) \approx I_2$$

where $E=T_2^{-1}\{T_1(I_1)\}$, which is what the filtering operation F(.) is intended to remove. This estimate is subtracted from the original image in FIG. 9a, giving:

$$T_2^{-1}\{T_1(I_1)+T_2(I_2)\} - \hat{I}_2 = E+I_2 - \hat{I}_2 \approx E$$

The result of which is shown in FIG. 9c. Recalling that $E=T_2^{-1}\{T_1(I_1)\}$, it is clear that by first applying to the approximate E the operation $T_2$ and next $T_1^{-1}$ in succession, one would get an estimate of $I_1$, the result of which is shown in FIG. 9d. This can be seen by using the symbol ○ to denote sequences of transformations and noting that $$T_1^{-1} \circ T_2 \circ T_2^{-1} \circ T(I_1) = I_1$$

FIG. 9d shows that the (scattered) long range echo or interference from the second device has been essentially removed from the mix. It is of course possible to carry out the same operation with respect to the closer echo, i.e. relating to the curved line, and remove it for the purpose of seeing the far range echo or signals from the second device more clearly. In that case, as in most practical situations, a more advanced filter than an outlier-removal filter would be used. A filter bank of best-matching horizontal or close-to-horizontal line filters would be one option, adaptive filters of the image in the horizontal direction, such as using Wiener-filter, Kalman-filters or particle filters would be other options. Predictive filtering could be used, as could a fast Fourier transform (FFT) of the image followed by extracting only those components in the image yielding slow or continuous changes in the horizontal directions of the images.

This procedure could be repeated iteratively until sufficient separation has been obtained, gradually separating the distinct echo ranges or different devices more and more.

In some cases, it might not be necessary to subtract the signals from the second device, or echoes from the longer range at all, since a sufficiently advanced tracker would be able to would treat the (non-repeating) echoes added onto the echoes of interest as inherent noise.

In any case, it will be seen that by applying a time-shift function to the output signals and later inverting this effect in the impulse response domain, the echoes of interest will form a continuous line, relating to a "physically plausible motion", whereas the echoes that are not of interest will appear as scattered noise. Alternatively if the system tries to interpret the 'shifted' impulse response from a distant object, or from a different device, as a real object close to the object of interest, it is nonetheless likely to appear to have a "physically implausible motion". Thus, the plausibility or implausibility of the movement of an object in a scene can be used as a basis for ignoring it or removing it from a tracking task.

It will also be seen by the person skilled in the art, that since there is motion continuity and, most often, a limited bandwidth of the signal, the motion of the object of interest will create an impulse response image that has slow or relatively slow variation in the horizontal direction, i.e. each line of the impulse response image will contain only relatively low frequency components unless the object is moving very fast. Thus, if no "scattered echo" is added to the clear impulse response image, it will be low-frequency image in the horizontal direction. The scattered echoes, however, will add high-frequency content in the horizontal direction. The effect of (a) applying a time-shift function; (b) computing the impulse response image; and (c) applying the inverse filter in the impulse response domain, has the effect of shifting the unwanted echoes upwards in frequency, while retaining the echoes of interest in the low-frequency range. This high/low-frequency separation provides a further basis for separating the echoes from one another.

Figure 10A:
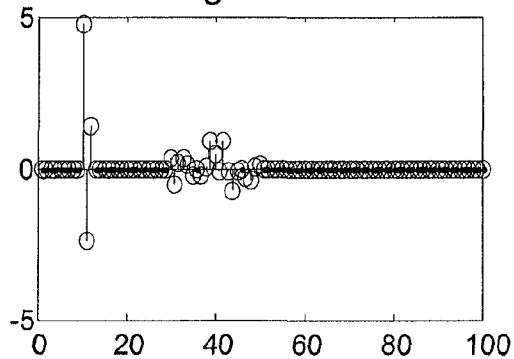
FIGS. 10 and 11 are schematic impulse-response diagrams illustrating how codes and correlation are used in an embodiment of the invention.

FIG. 10a show an impulse response $h_1(t)$ recorded by a first device embodying the invention, during an impulse response estimation process, where there is no interference from a second device. Note that there is a strong direct path signal on the left side (received earlier in time), followed by a set of trailing echoes reflected from an object stretching rightwards (received later in time). The first device is configured to estimate and analyse these echoes, in order to determine the motion of e.g. a human finger.

Figure 11A:
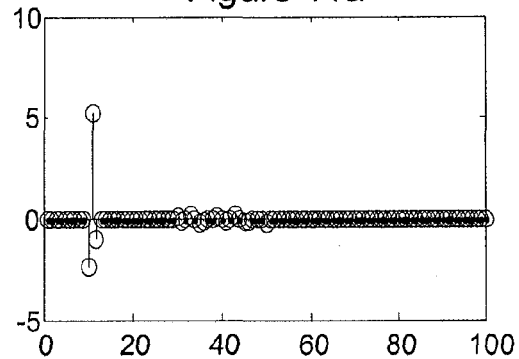

FIG. 11a shows an interfering impulse signal $h_2(t)$ from a second device, as it would be received by the first device. Here, the trailing echoes are relatively much weaker than the direct path signal as compared to the situation shown in FIG. 10a. This is because the echoic signal is attenuated as the inverse square of distance whereas the direct path signal is only attenuated as the inverse of distance. Interference from the direct path signal from the second device is therefore of more concern than its echoes.

Figure 10B:
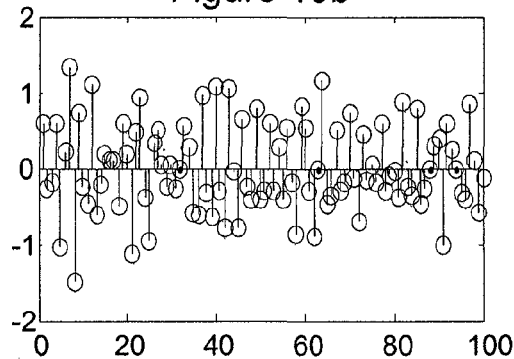
Figure 11B:
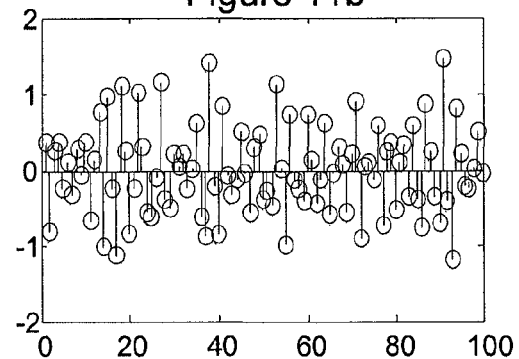

FIGS. 10b and 11b shows the codes $c_1(t)$ and $c_2(t)$ used by the two devices. These codes are used in the signals output from the first and second device respectively, and are correlated with the received signals in order to retrieve the channel impulse response for the device. The codes here are sequences of random numbers convolved with a band-pass filter reflecting the system bandwidth.

Figure 10C:
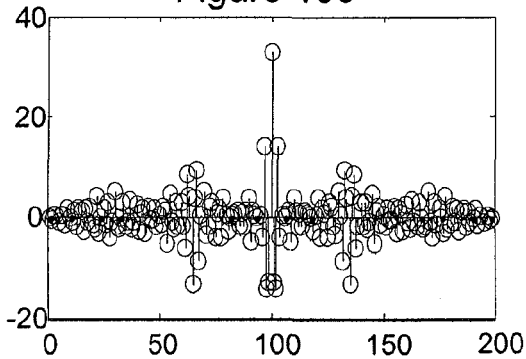
Figure 11C:
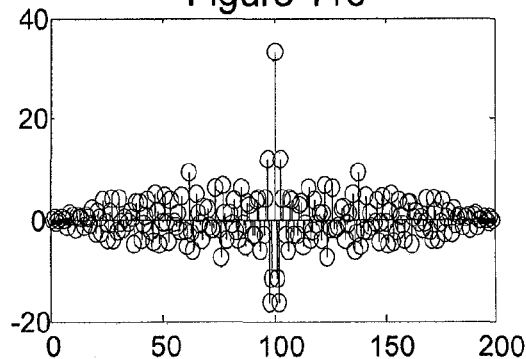
Figure 10D:
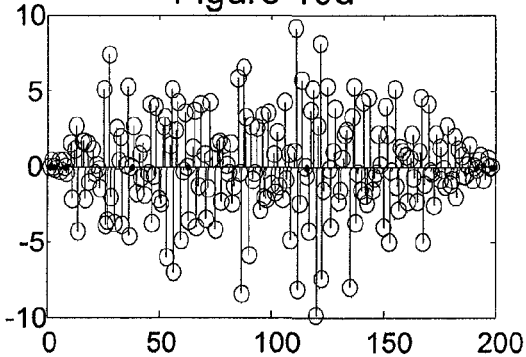
Figure 11D:
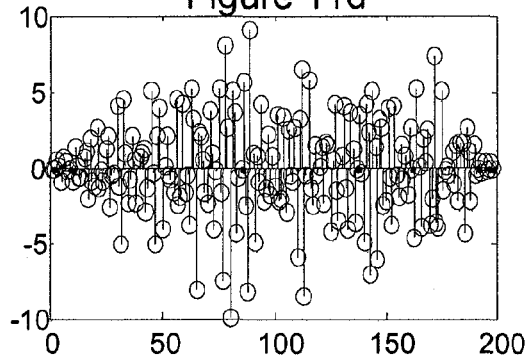

FIGS. 10c and 11c respectively show autocorrelation functions $r_{11}=c_1(t)*c_1(-t)$ and $r_{22}=c_2(t)*c_2(-t)$ for the two codes. These are symmetrical about the vertical axis. FIGS. 10d and 11d respectively show the cross-correlations $r_{12}=c_1(t)*c_2(-t)$ and $r_{21}=c_2(t)*c_1(-t)$ between the two codes.

FIG. 12 shows a situation in which coded transmissions are relied upon for impulse response estimation. FIG. 12a shows the "ideal" impulse response $h_1(t)$ which the first device would estimate if there were no interference to deal with.

Figure 12A:
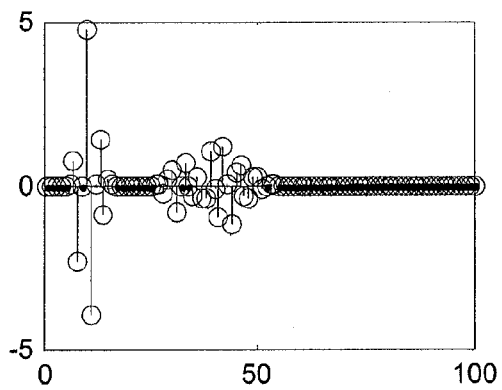
FIG. 12 is a schematic impulse-response diagram showing the results of interference.
Figure 12B:
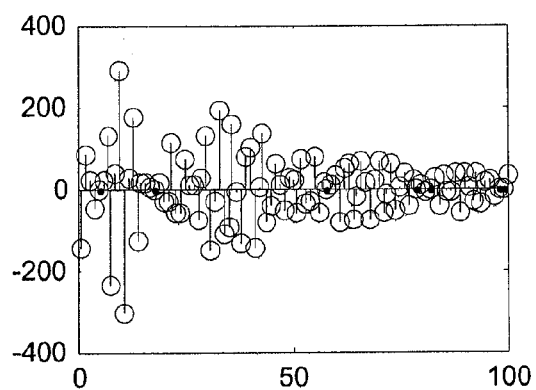
Figure 12C:
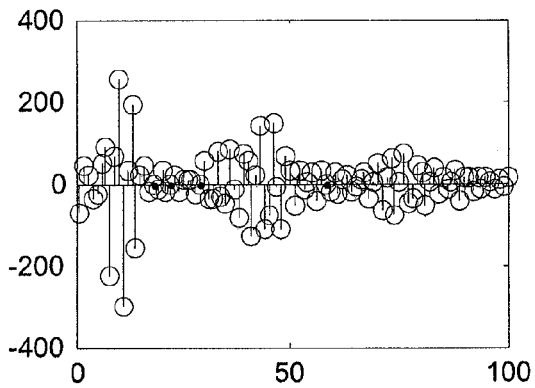

FIG. 12c shows the estimate arising from transmitting using a first code and deconvolving the return signal by the transmit code; i.e. the estimate $$\hat{h}_1(t) = \underbrace{[h_1(t)*c_1(t)]}_{y_1(t)} * c_1(-t) = h_1(t)*c_1(t)*c_1(-t) = h_1(t)*r_{11}(t)$$

where $y_1(t)$ under the brackets is the actual signal received by the first device, which is subsequently matched with the time-reversed code, giving an estimate equal to the ideal impulse response $h_1(t)$ convolved with the code autocorrelation function.

Theoretically, if the code were perfectly white, or equal to a sinc signal spanning the bandwidth of the impulse response, the estimate would have been perfect. However this is not possible in practice. Nonetheless, important trends can be determined from the impulse response estimate which can be used to determine or characterise the movement of an input object such as a user's finger. Also, better codes or better deconvolution using inversion principles can be employed, as explained in WO 2006/067436.

When there is interference, the received signal $y_1(t)$ will contain the received coded signal from the second device and its own impulse response signal, i.e.

$$y_1(t) = h_1(t) * c_1(t) + h_2(t) * c_2(t)$$

This might arise when the two devices are placed at a distance which is equal to one system frame length. For instance, the frame length might typically be equal to 500 samples, with a sampling frequency of 192 kHz. This corresponds to 384 update frames per second. If the two devices are separated by 85 cm, which is the distance traveled by sound in $\frac{1}{384}$ seconds, then they are 500 samples away from another.

Deconvolving the receive signal by $c_1(t)$ gives $$\tilde{h}_1(t) = [h_1(t) * c_1(t) + h_2(t) * c_2(t)] * c_1(-t) \quad (1)$$
$$= h_1(t) * c_1(t) * c_1(-t) + h_2(t) * c_2(t) * c_1(-t)$$
$$= h_1(t) * r_{11}(t) + h_2(t) * r_{21}(t)$$

This estimate is shown in FIG. 12b and can be seen to be much worse than the estimate in FIG. 12c.

As was previously noted, the main contributing interfering element to the true impulse response $h_2(t)$ is the direct path signal. It seems reasonable therefore to assume that it is the direct path signal from the second device which largely distorts the estimate.

Figure 12D:
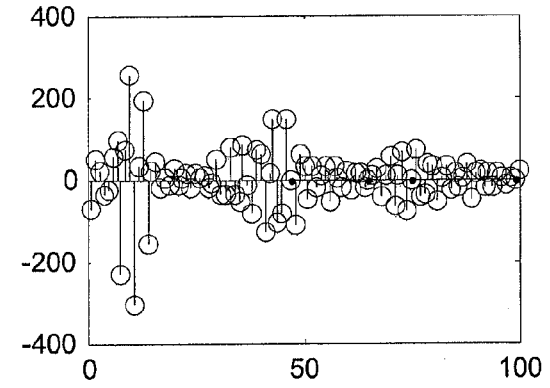

In confirmation of this, FIG. 12d shows a further estimate of $h_1(t)$, but this time with the first part of the impulse response $h_2(t)$, i.e. those relating to the strong direct path signal, artificially set to zero. This estimate is comparable with the interference-free estimate shown in panel FIG. 12c. This illustrates the previously-made point that the direct path signal from a second device is typically the more problematic one for estimation purposes. Indirect signals from a second device, i.e. signals from the second device which are reflected from a finger close to the second device for instance, are much less of a problem.

This illustrates the importance of eliminating or mitigating the direct path signal from a second device. As shown below, this can be accomplished using appropriate time-shifting strategies, in accordance with embodiments of the present invention.

A code length of 100 samples and a frame length of 500 samples is assumed throughout the following description of a time-shifting embodiment. However, other lengths can be used.

According to this embodiment, a time-delayed estimate of the impulse response is obtained by the first device delaying the transmit time of its output code by a period $\tau$, whilst assuming that the second device does not alter its transmissions in any way. This gives a receive signal $$y_1(t) = h_1(t) * c_1(t-\tau) + h_2(t) * c_2(t)$$

which, upon deconvolution by the actual output signal $c_1(t-\tau)$ from the device gives:

$$\tilde{h}_1(t, \tau) = [h_1(t) * c_1(t-\tau) + h_2(t) * c_2(t)] * c_1(\tau-t)$$
$$= h_1(t) * c_1(t-\tau) * c_1(\tau-t) + h_2(t) * c_2(t) * c_1(\tau-t)$$
$$= h_1(t) * r_{11}(t) + h_2(t) * r_{21}(t+\tau)$$

The contribution from $h_1(t)$ remains the same as before, due to the fact that the time-delays in the auto-correlation step cancel each other out (the auto-correlation is invariant to time-shifts), whereas the cross-correlation part changes in comparison with equation (1) above. This fact is used to "shift away" the interference from the second device; in particular, from its direct path signal to the first device.

Figure 13:
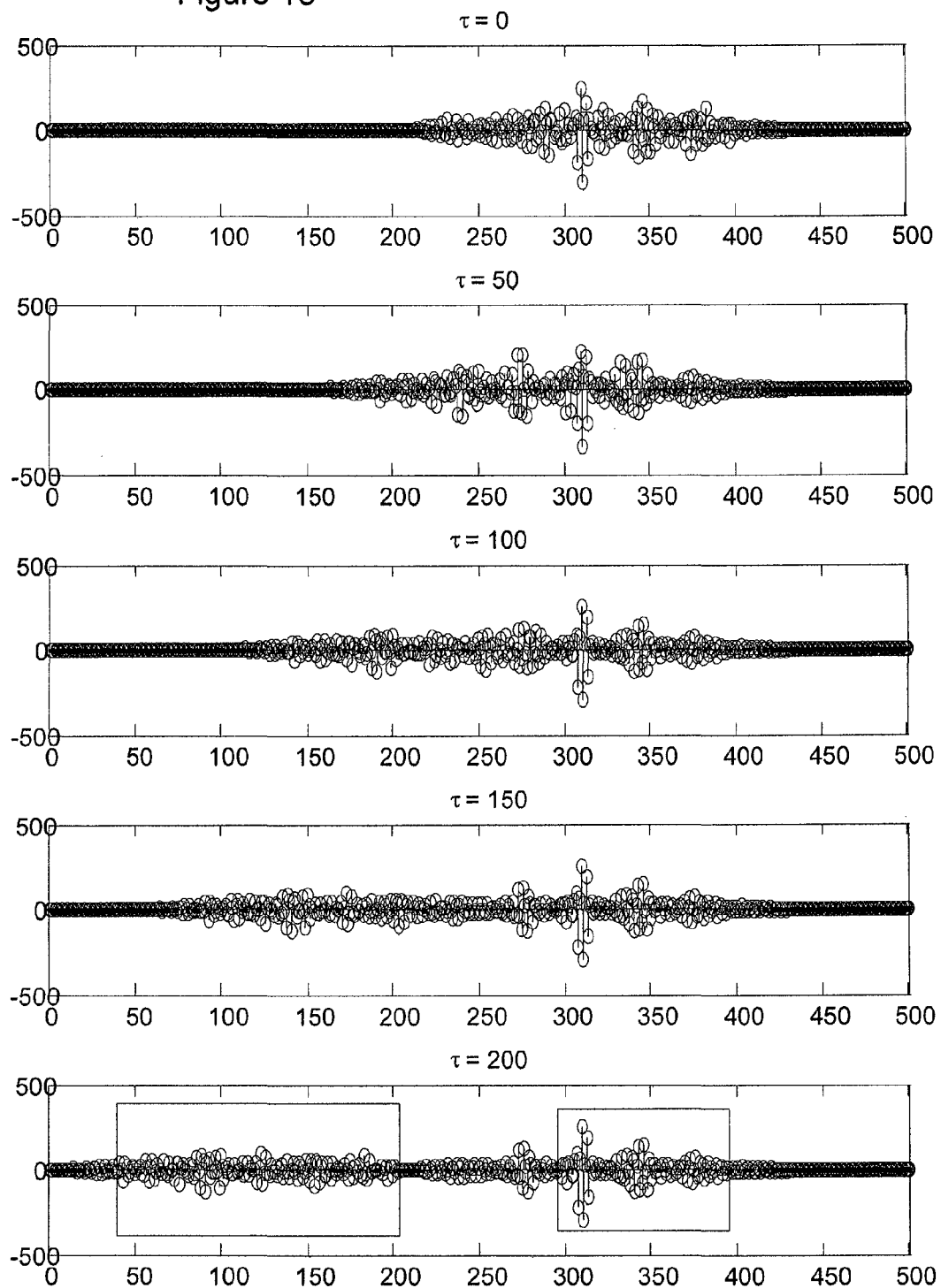
FIGS. 13, 14 and 15 are schematic impulse-response diagrams illustrating how temporal shifting can reduce interference.

FIG. 13 shows a series of impulse responses as received at the first device, for different values of $\tau$.

In the top panel, a "smearing" of the two codes using deconvolution is visible. Increasing the time-delay parameter $\tau$ however, leads to the interfering cross-correlation contribution gradually being moved towards the left (earlier in time). In the bottom panel, the area marked with a solid rectangle shows the interference-free impulse response estimate which is the same as that shown in FIG. 12c. The dashed rectangle represents the interfering signal portion, which it may be noted is 'wider' along the time axis than the desired signal, shown in the solid lined box. In this context, 'wider', means that decay relative to a centre or a central peak in the window is quite slow.

Figure 14:
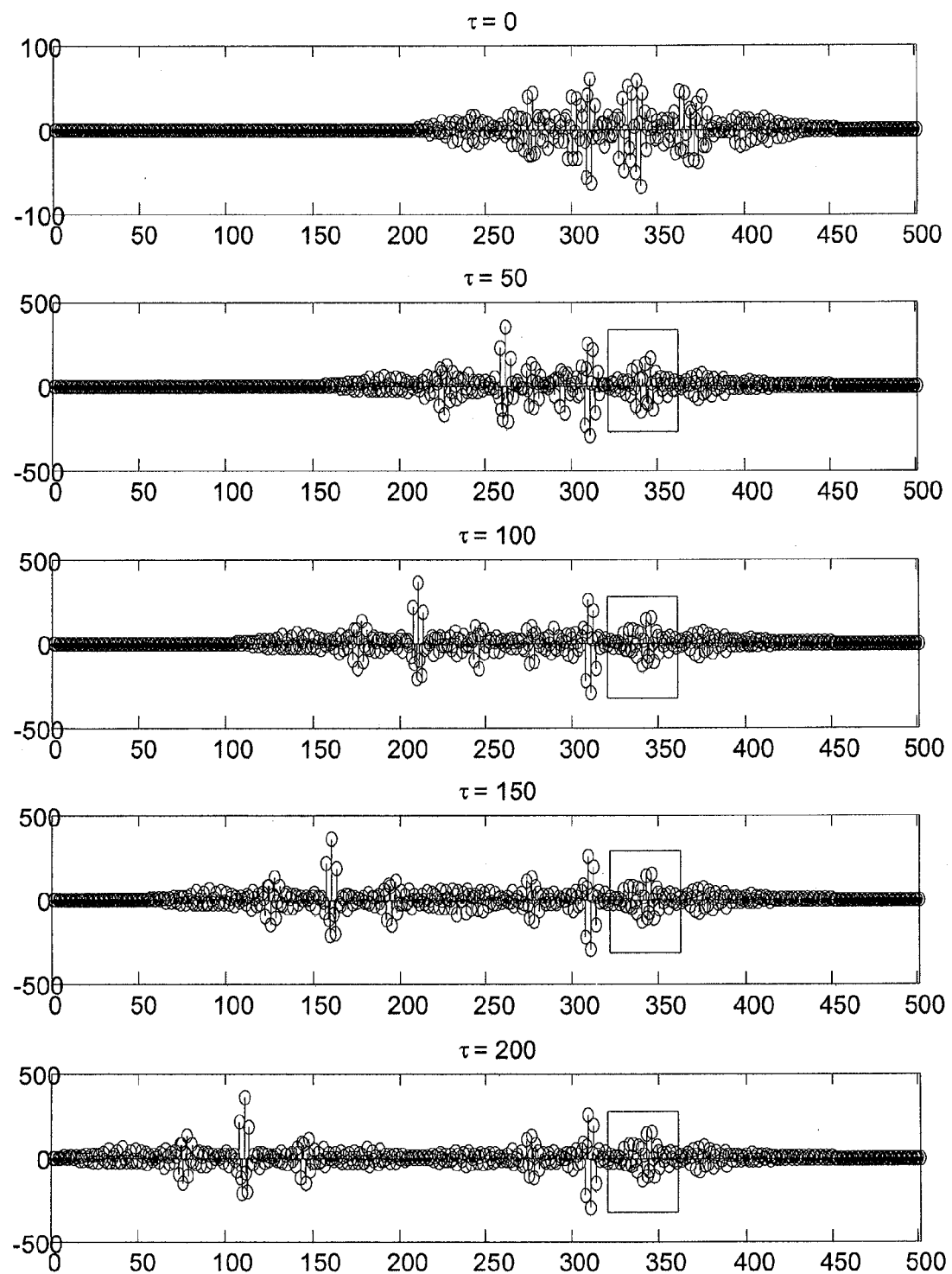

If, counter-intuitively, the same set of codes is used for both devices, i.e. $c_1(t)=c_2(t)$, this leads to a much narrower cross-correlation function as long as the codes are reasonably white. The result of applying the condition $c_1(t)=c_2(t)$ is shown in FIG. 14, for a variety of time-shift values. The area of interest (i.e. the echoes trailing the direct path signal from the first device, as shown with the solid boxes) is then more reliably separable from the overlapping echoes when using two different codes, even when using a shorter time delay $\tau$. If an even more self-orthogonal sequence had been used, the delay $\tau$ could have been further altered, i.e. there would more flexibility in its choice. Alternatively, if the code was insufficiently self-orthogonal to provide an approximate single-peak autocorrelation function, an inversion technique could be used in place of the cross-correlation, as disclosed in WO2006/067436. Considering FIG. 14 bottom panel, one could see such a method leading to a sharper peak in the central part on the left side, with the sidelobes around them even further pushed down. The net result would a better focussing of the interfering signal, or a better 'containment' of it. Moreover, when only a single code is used, this code can be made as white (i.e. "self-orthogonal") as possible, rather than striving for it to be independent or orthogonal with a second code.

For instance, if a chirp signal is used, the separation could be even better, with the area of interest being visible for even lower values of $\tau$. This in turn, makes this method less sensitive to the selection of the delay parameter $\tau$, which is an important advantage.

Figure 15:
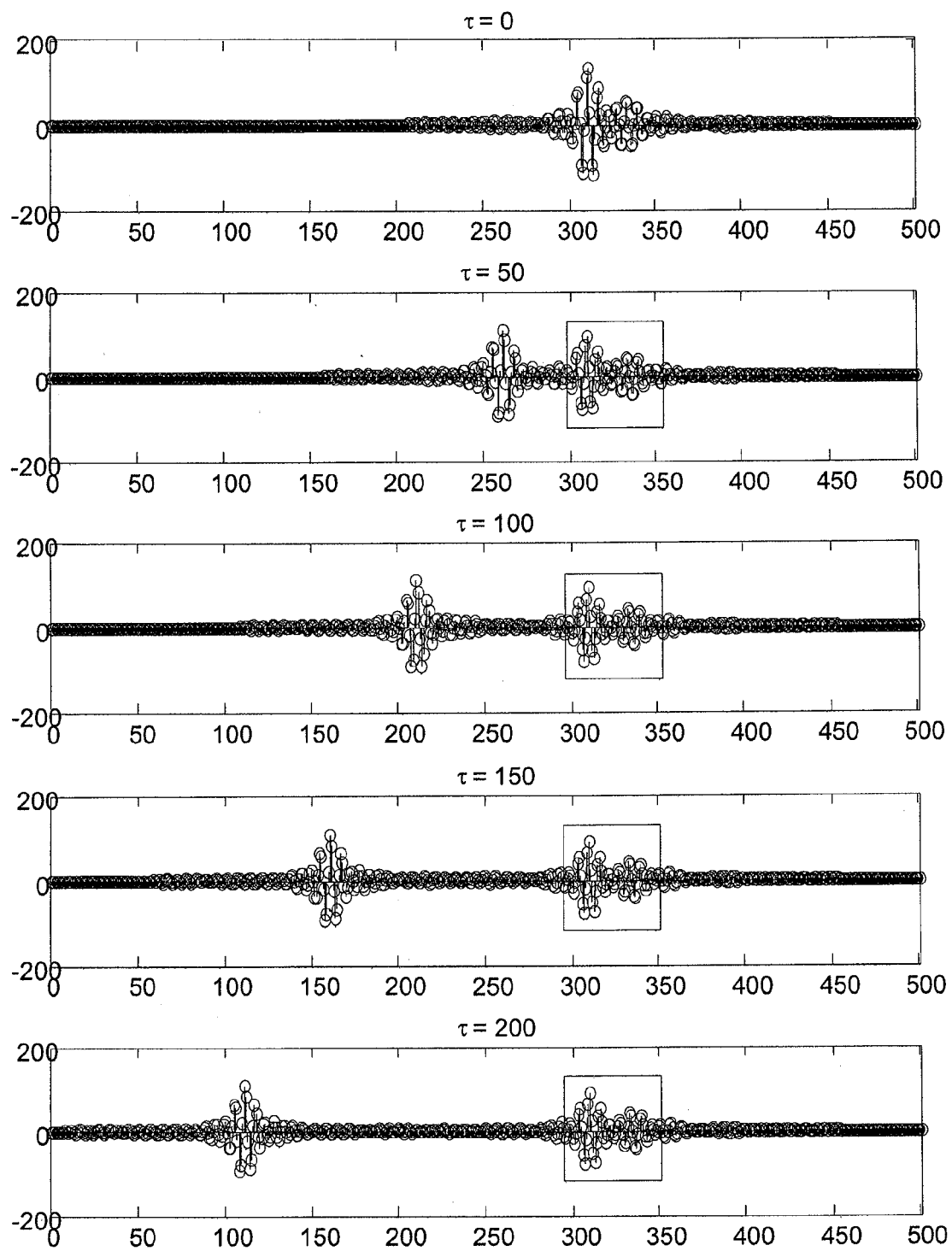

The effect of using a band-limited white code, such as a chirp with a limited frequency band, is shown in FIG. 15, for different values of $\tau$. It can be seen that the ability to separate the interfering source from the desired impulse response estimate (in the solid boxes) is increased. The impulse response estimate part is somewhat altered relative to FIGS. 13 and 14, due to the use of a different code.

Therefore effectively what is happening is that the first device detects that a certain part of a time-frame is "busy", due to another device's direct path or another very strong interfering effect, and so delays the timing of its transmit signal sufficiently to shift the echoes to a "clear" region.

Preferably therefore, the codes used by the devices are chosen so that, when a device sees a signal resulting from its own coded transmission, and a signal resulting from a coded transmission from a second device, those two codes are the same or substantially the same.

Note that the codes used may change over time, i.e. they need not be the same for every time frame, but rather can change according to a predefined or on-the-fly generation scheme. It can be useful to change the codes over time, since this has the effect of 'smearing out' the contributions of far-away echoes.

However, unlike the case with the direct path signal from a second device, echoes of the first device's signals from earlier frames tend to be much weaker, and smearing these out then becomes a better strategy than trying to time-shift, in order that all echoes from all previous frame are 'avoided'. Therefore a combination of applying a time-shift to avoid interference from another device, and code-changing to avoid self-interference from weaker echoes resulting from previous transmissions, is preferably employed.

Figure 16:
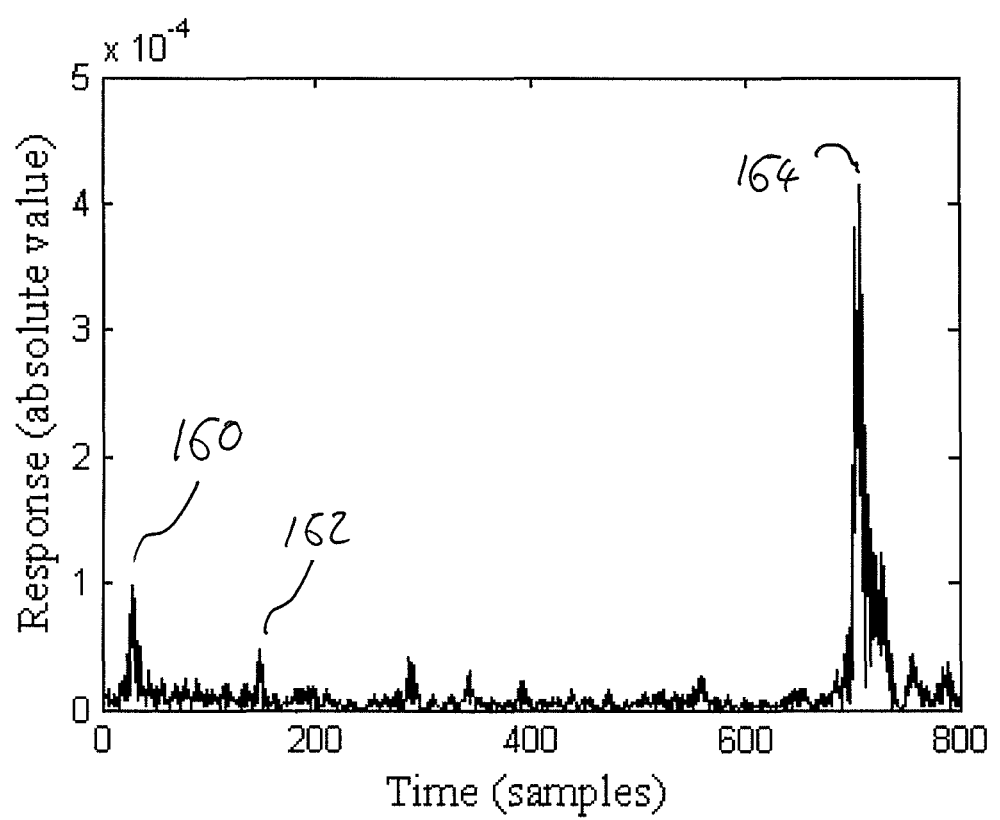
FIG. 16 is a graph of a pulse response from an experimental set up demonstrating interference.

FIG. 16 shows pulse-response data from an experimental set in which a first device was facing a second device, approximately 90 cm away. A small ball, acting as an object of interest, was located 25 cm away from and directly in front of the first device. Both devices emitted linear chirps of comparable strengths in the frequency band 20 kHz to 40 kHz. The sampling frequency was 96,000 samples/s, with 100-sample long chirps at a repetition rate of 120 pings/s.

The pulse-response data in FIG. 16 was captured by the first device. The first peak 160 corresponds to the direct-path signal between the transmitter of the first device and its own receiver. The second, slightly later peak 162 corresponds to the echo from the ball. The much-strong, third peak 164 corresponds to the direct-path signal from the transmitter of the second device to the receiver of the first device. As can be seen, the strength of this interfering peak from the second device is much greater than either the first device's direct-path signal or the reflection from the object of interest, because of the alignment of the transducers.

This demonstrates why interference can from a second device can be a serious problem, because of the potential for signals of interest to be swamped by much-stronger interference. The present invention seeks to address this difficulty.

The invention claimed is:

1. A method of operating a first handheld electronic device in the presence of a second handheld electronic device wherein the first and second devices are configured to transmit acoustic signals the for user input detection, the first device being configured to transmit first acoustic signals with a first signal characteristic, the method comprising:
   the first device determining the presence of the second device;
   when the second device is determined to be present, thereafter altering a transmission of the first device so as to transmit second acoustic signals from the first device, the second acoustic signals having a second signal characteristic, different from the first signal characteristic;
   receiving said second acoustic signals at the first device, the second acoustic signals comprising reflections of the transmitted second acoustic signals from an object; and
   using the received second signals to characterize the motion of the object and thereby to control a function of the first device,
   wherein the second signal characteristic gives a reduced interference between acoustic signals transmitted from the first and second devices respectively than the first signal characteristic.

2. The method as claimed in claim 1 wherein the transmit signals are periodic or quasi-periodic so as to define a frame rate, and the first and second signal characteristics comprise different respective frame rates.

3. The method as claimed in claim 2 wherein the second signal characteristic comprises a frame rate more than 10 percent different from a frame rate of signals transmitted by the second device.

4. The method as claimed in claim 1 wherein the difference between the first and second signal characteristics is a fixed time offset between the transmission of the signals having the first characteristic and the signals having the second characteristic.

5. The method as claimed in claim 4 wherein the transmit signals are periodic or quasi-periodic so as to define a frame rate, and wherein the fixed time offset is caused by altering the length of one or more frames.

6. The method as claimed in claim 5 where the length of the frame(s) is lengthened by introducing a period in which the first device does not transmit.

7. The method as claimed in claim 1 comprising detecting the signals of the second device indirectly as an interference effect on the signals received by the first device arising from transmissions by the first device itself.

8. The method as claimed in claim 1 wherein the first device and the second device transmit acoustic signals having the same encoding.

9. The method as claimed in claim 1 comprising the first device starting to use an increased portion of a time-frequency resource in response to detecting the presence of a noise or interfering source.

10. The method as claimed in claim 9 comprising the first device detecting when the noise or interfering source has gone, and reducing its time-frequency resource consumption.

11. The method as claimed in claim 1 comprising the first device, in response to detecting the presence of a noise or interfering source, starting to transmit signals of greater duration or bandwidth or intensity than the signals it transmitted immediately preceding the detection.

12. The method as claimed in claim 1 wherein the first device determines the presence of the second device by the acoustic signals the second device transmits.

13. The method as claimed in claim 12 comprising the first device recognizing one or more of a frequency, pattern of frequencies, spread of frequencies, change of frequencies, timing, or repetition rate of a signal to determine the presence of the second device.

14. The method as claimed in claim 1 comprising the first device transmitting signals at a frame rate, and changing the frame rate at intervals or continuously.

15. The method as claimed in claim 14 comprising the first device changing the frame rate and comparing signals received before the change with signals received after the change.

16. The method as claimed in claim 1 comprising the first device determining the presence of a second device using a separate communication channel from that used by the transmitted signals.

17. The method as claimed in claim 1 wherein the first device receives information over the communication channel from the second device and adjusts its transmissions on the basis of the information.

18. The method as claimed in claim 17 wherein the communication channel is two-way.

19. The method as claimed in claim 17 wherein the first device and the second device communicate to coordinate adjustments to their transmissions so as to reduce or minimize or substantially eradicate interference in motion characterization operations of both devices.

20. The method as claimed in claim 1 comprising one of a plurality of communicating devices directing adjustments in transmissions by the other device or devices.

21. The method as claimed in claim 1 comprising the first device ceasing transmitting signals while it receives signals from another device, and processing the received signals to determine information from or about the second device.

22. The method as claimed in claim 1 comprising iteratively adjusting the transmissions of the first and/or a second device, and attempting to characterize the motion of an object, over a number of iterations, in order to determine an adjustment that improves the accuracy of the motion characterization.

23. The method as claimed in claim 1 comprising tracking the motion of a human hand or part thereof.

24. The method as claimed in claim 1 comprising identifying a hand gesture.

25. The method as claimed in claim 1 wherein the first and/or second device is a portable device.

26. The method as claimed in claim 1 comprising the first device calculating successive impulse responses from received signals corresponding to successive time frames of a transmit signal.

27. The method as claimed in claim 1 wherein the transmitted signals are ultrasonic.

28. The method of claim 1, wherein the difference between the first and second signal characteristics is selected from the group consisting of:
 a difference between respective frame rates of the acoustic signals;
 a difference between respective repetition rates of the acoustic signals;
 a fixed time offset between the transmission of the acoustic signals having the first characteristic and the acoustic signals having the second characteristic;
 a difference between respective timing patterns of the acoustic signals;
 a duration of the second acoustic signals being greater than a duration of the first acoustic signals;
 a bandwidth of the second acoustic signals being greater than a bandwidth of the first acoustic signals;
 an intensity of the second acoustic signals being greater than an intensity of the first acoustic signals;
 a difference between respective directions of propagation of the acoustic signals;
 a difference due to the addition of a time-shift function to the second acoustic signals; and
 a difference due to the addition of dithering to an underlying, stable frame rate of the second acoustic signals.

29. The method of claim 1, further comprising applying an inverse time-shift function to the received signals.

30. The method of claim 1, wherein the first device is configured to use a first processing algorithm to process received signals comprising reflections of the first acoustic signals, the method further comprising using a second processing algorithm to process the received signals comprising reflections of the second acoustic signals.

31. A first handheld electronic device comprising:
 a transmitter adapted to transmit first acoustic signals for user input detection with a first signal characteristic;
 a receiver adapted to receive acoustic signals comprising reflections of the transmitted first acoustic signals of the first device from an object,
 wherein the electronic device is adapted:
 to determine the presence of a second handheld electronic device, the second device being configured to transmit acoustic signals;
 after determining the presence of the second device, to alter a transmission of the first device so as to transmit second acoustic signals with a second signal characteristic, different from the first signal characteristic, the receiver thereafter being adapted to receive said second acoustic signals comprising reflections of the transmitted second acoustic signals of the first device from the object; and
 to use the received second signals to characterize the motion of the object and thereby control a function of the first device,
 wherein the second signal characteristic gives a reduced interference between acoustic signals transmitted from the first and second devices respectively than the first signal characteristic.

32. The device as claimed in claim 31 wherein the transmit signals are periodic or quasi-periodic so as to define a frame rate, and the first and second signal characteristics comprise different respective frame rates.

33. The device as claimed in claim 32 wherein the second signal characteristic comprises a frame rate more than 10 percent different from a frame rate of signals transmitted by the second device.

34. The device as claimed in claim 31 wherein the difference between the first and second signal characteristics is a fixed time offset between the transmission of the signals having the first characteristic and the signals having the second characteristic.

35. The device as claimed in claim 34 wherein the transmit signals are periodic or quasi-periodic so as to define a frame rate, and wherein the fixed time offset is caused by altering the length of one or more frames.

36. The device as claimed in claim 35 configured to increase the length of the frame(s) by introducing a period in which the first device does not transmit.

37. The device as claimed in claims 31 configured to detect the signals of the second device indirectly as an interference effect on the signals received by the first device arising from transmissions by the first device itself.

38. The device as claimed in claim 31 configured to transmit acoustic signals having the same encoding as those transmitted by the second device.

39. The device as claimed in claim 31 configured, in response to detecting the presence of a noise or interfering source, to start to transmit signals of greater duration or bandwidth or intensity than the signals the device transmitted immediately preceding the detection.

40. The device as claimed in claim 31 configured to determine the presence of a second device by the acoustic signals the second device transmits.

41. The device as claimed in claim 40 configured to recognize one or more of a frequency, pattern of frequencies, spread of frequencies, change of frequencies, timing, or repetition rate of a signal to determine the presence of the second device.

42. The device as claimed in claim 31 configured to transmit signals at a frame rate, and to change the frame rate at intervals or continuously.

43. The device as claimed in claim 42 configured to change the frame rate and compare signals received before the change with signals received after the change.

44. The device as claimed in claims 31 configured to determine the presence of a second device using a separate communication channel from that used by the transmitted signals.

45. The device as claimed in claim 31 configured to receive information over the communication channel from the second device and to adjust its transmissions on the basis of the information.

46. The device as claimed in claim 45 wherein the communication channel is two-way.

47. The device as claimed in claim 45 configured to communicate with the second device to coordinate adjustments to their transmissions so as to reduce or minimize or substantially eradicate interference in motion characterization operations of both devices.

48. A first portable handheld electronic device comprising:
- an ultrasonic transmitter and an ultrasonic receiver and adapted to detect the presence of a second handheld device transmitting ultrasonic signals,
- the first portable handheld device being adapted to transmit ultrasonic signals for user input detection at a power level dependent on whether the second handheld device is detected,
- the first portable handheld device is adapted to receive ultrasonic reflections to characterize the motion of an object and thereby control a function of the first portable handheld device,
- wherein the power level reduces interference between transmissions of the first portable handheld device and the second handheld device.

49. The device of claim 31, wherein the difference between the first and second signal characteristics is selected from the group consisting of:
- a difference between respective frame rates of the acoustic signals;
- a difference between respective repetition rates of the acoustic signals;
- a fixed time offset between the transmission of the acoustic signals having the first characteristic and the acoustic signals having the second characteristic;
- a difference between respective timing patterns of the acoustic signals;
- a duration of the second acoustic signals being greater than a duration of the first acoustic signals;
- a bandwidth of the second acoustic signals being greater than a bandwidth of the first acoustic signals;
- an intensity of the second acoustic signals being greater than an intensity of the first acoustic signals;
- a difference between respective directions of propagation of the acoustic signals;
- a difference due to the addition of a time-shift function to the second acoustic signals; and
- a difference due to the addition of dithering to an underlying, stable frame rate of the second acoustic signals.

50. The device of claim 31, further arranged to apply an inverse time-shift function to the received signals.

51. The device of claim 31, wherein the first device is configured to use a first processing algorithm to process received signals comprising reflections of the first acoustic signals, the device further being arranged to use second processing algorithm to process the received signals comprising reflections of the second acoustic signals.

52. A non-transitory computer readable medium product configured, when run on a first handheld electronic device, to operate the device in the presence of a second handheld electronic device, wherein the first and second devices are configured to transmit acoustic signals for user input detection, comprising:
- instructions for transmitting first acoustic signals with a first signal characteristic;
- logic for determining the presence of the second device;
- instructions for altering a transmission of the first device after the presence of the second device is determined, so as to transmit second acoustic signals with a second signal characteristic, different from the first signal characteristic;
- logic for processing said second acoustic signals received at the first device comprising reflections of the transmitted second acoustic signals from an object; and
- logic adapted to use the received second signals to characterize the motion of the object and thereby control a function of the first device,
- wherein the second signal characteristic gives a reduced interference between acoustic signals transmitted from the first and second devices respectively than the first signal characteristic.

53. The non-transitory computer readable medium of claim 52, wherein the difference between the first and second signal characteristics is selected from the group consisting of:
- a difference between respective frame rates of the acoustic signals;
- a difference between respective repetition rates of the acoustic signals;
- a fixed time offset between the transmission of the acoustic signals having the first characteristic and the acoustic signals having the second characteristic;
- a difference between respective timing patterns of the acoustic signals;
- a duration of the second acoustic signals being greater than a duration of the first acoustic signals;
- a bandwidth of the second acoustic signals being greater than a bandwidth of the first acoustic signals;
- an intensity of the second acoustic signals being greater than an intensity of the first acoustic signals;
- a difference between respective directions of propagation of the acoustic signals;
- a difference due to the addition of a time-shift function to the second acoustic signals; and
- a difference due to the addition of dithering to an underlying, stable frame rate of the second acoustic signals.

54. The non-transitory computer readable medium of claim 52, further comprising logic for applying an inverse time-shift function to the received signals.

55. The non-transitory computer readable medium of claim 52, wherein the instructions comprise a first processing algorithm to process received signals comprising reflections of the first acoustic signals, the instructions further comprising a second processing algorithm to process the received signals comprising reflections of the second acoustic signals.

* * * * *